(12) United States Patent
Kita et al.

(10) Patent No.: US 10,001,681 B2
(45) Date of Patent: Jun. 19, 2018

(54) LIQUID CRYSTAL DISPLAY DEVICE

(71) Applicant: Sharp Kabushiki Kaisha, Sakai, Osaka (JP)

(72) Inventors: Yuichi Kita, Sakai (JP); Iori Aoyama, Sakai (JP); Takahiro Sasaki, Sakai (JP); Kazutaka Hanaoka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days. days.

(21) Appl. No.: 15/508,146

(22) PCT Filed: Aug. 25, 2015

(86) PCT No.: PCT/JP2015/073851
§ 371 (c)(1),
(2) Date: Mar. 2, 2017

(87) PCT Pub. No.: WO2016/035611
PCT Pub. Date: Mar. 10, 2016

(65) Prior Publication Data
US 2017/0285423 A1     Oct. 5, 2017

(30) Foreign Application Priority Data

Sep. 3, 2014 (JP) .................. 2014-179204

(51) Int. Cl.
*G09G 3/30* (2006.01)
*G02F 1/13* (2006.01)
(Continued)

(52) U.S. Cl.
CPC ........ *G02F 1/134363* (2013.01); *G02F 1/137* (2013.01); *G02F 1/1368* (2013.01);
(Continued)

(58) Field of Classification Search
CPC .................. G09G 3/18; G09G 3/3607; G09G 2320/0673; G02F 1/134363
See application file for complete search history.

(56) References Cited

U.S. PATENT DOCUMENTS 9,824,648 B2 * 11/2017 Hsieh .................. G09G 3/3607
2005/0024548 A1     2/2005 Choi et al.
(Continued)

FOREIGN PATENT DOCUMENTS

| JP | 2002-365657 A | 12/2002 |
| JP | 2006-523850 A | 10/2006 |
| WO | 2013/001979 A1 | 1/2013 |

*Primary Examiner* — Kevin M Nguyen
(74) *Attorney, Agent, or Firm* — Keating & Bennett, LLP

(57) ABSTRACT

Pixels of a liquid crystal display device exhibit, in a switched manner, a black display state where black display is provided in a state where a vertical electric field is generated in a liquid crystal layer, a white display state where white display is provided in a state where a lateral electric field is generated in the liquid crystal layer, and a transparent display state where a rear side of a liquid crystal display panel is seen through where no voltage is applied to the liquid crystal layer. A gray scale level group including gray scale levels from a lowest level to a highest level includes a white level, a transparent level having a luminance higher than that of the white level, and a plurality of sub-transparent levels each having a luminance higher than that of the white level and lower than that of the transparent level.

15 Claims, 16 Drawing Sheets

(51) Int. Cl.
*G02F 1/1343* (2006.01)
*G09G 3/36* (2006.01)
*G02F 1/1335* (2006.01)
*G02F 1/1368* (2006.01)
*G02F 1/1333* (2006.01)
*G02F 1/137* (2006.01)

(52) U.S. Cl.
CPC .. *G02F 1/133345* (2013.01); *G02F 1/133621* (2013.01); *G09G 3/3607* (2013.01); *G02F 2001/13706* (2013.01); *G02F 2001/133622* (2013.01); *G02F 2001/134372* (2013.01); *G02F 2001/134381* (2013.01); *G02F 2203/01* (2013.01)

(56) References Cited

U.S. PATENT DOCUMENTS

| | | | | |
|---|---|---|---|---|
| 2008/0297431 | A1* | 12/2008 | Yuuki | G02F 1/133615 345/1.1 |
| 2012/0287359 | A1* | 11/2012 | Yamazaki | G02F 1/1347 349/15 |
| 2014/0111561 | A1 | 4/2014 | Iyama et al. | |
| 2015/0192835 | A1* | 7/2015 | Kim | G09G 3/3208 345/589 |

\* cited by examiner

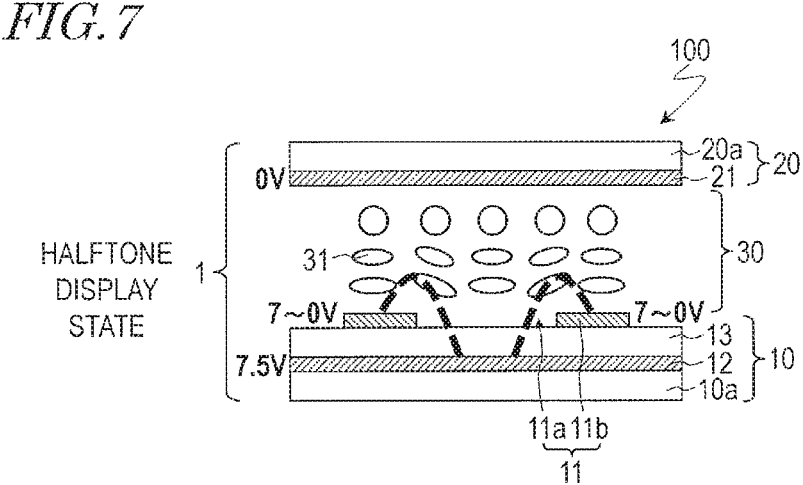
FIG.7
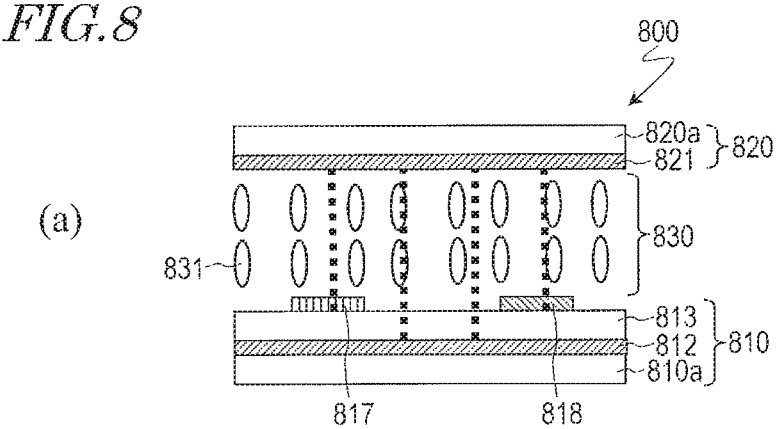
FIG.8
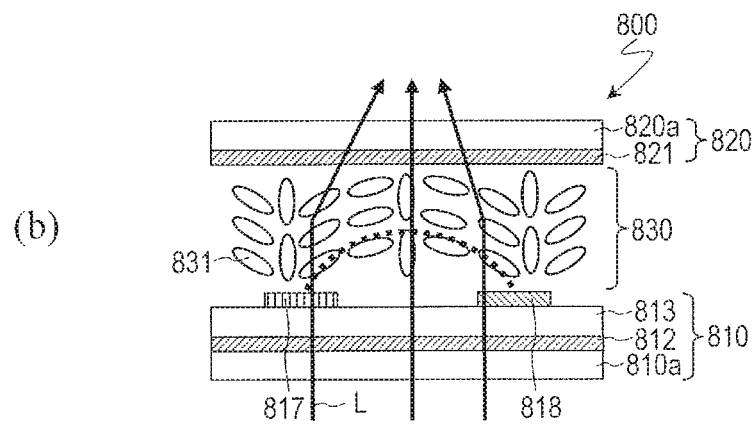

FIG. 21
(a) BLACK⇒WHITE
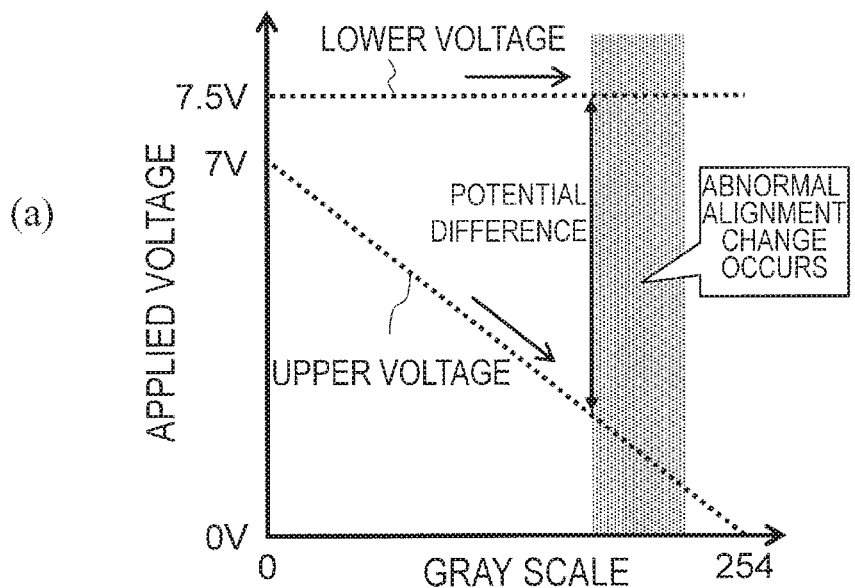
(b) WHITE⇒BLACK
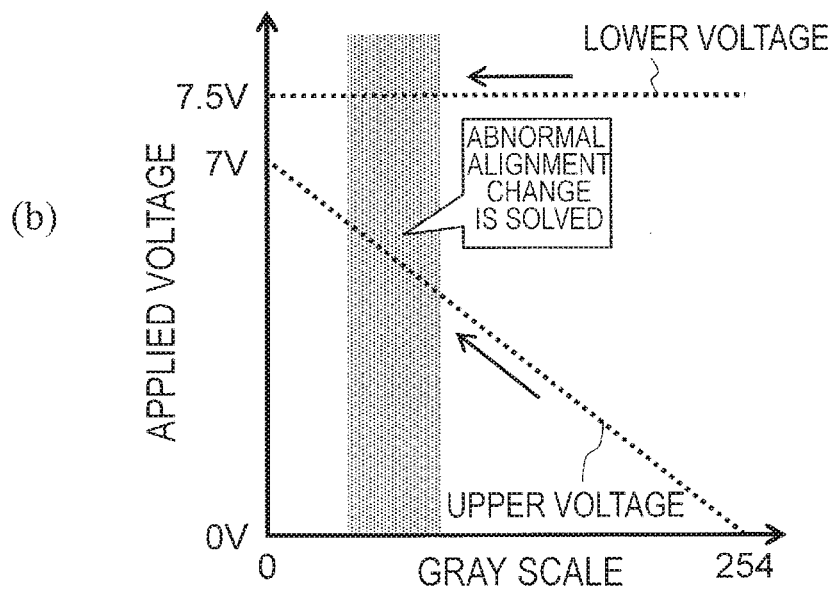

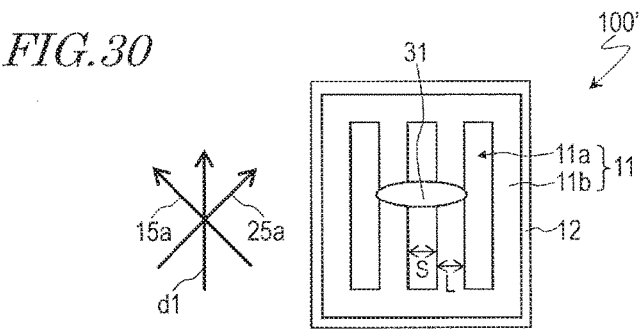
FIG.30
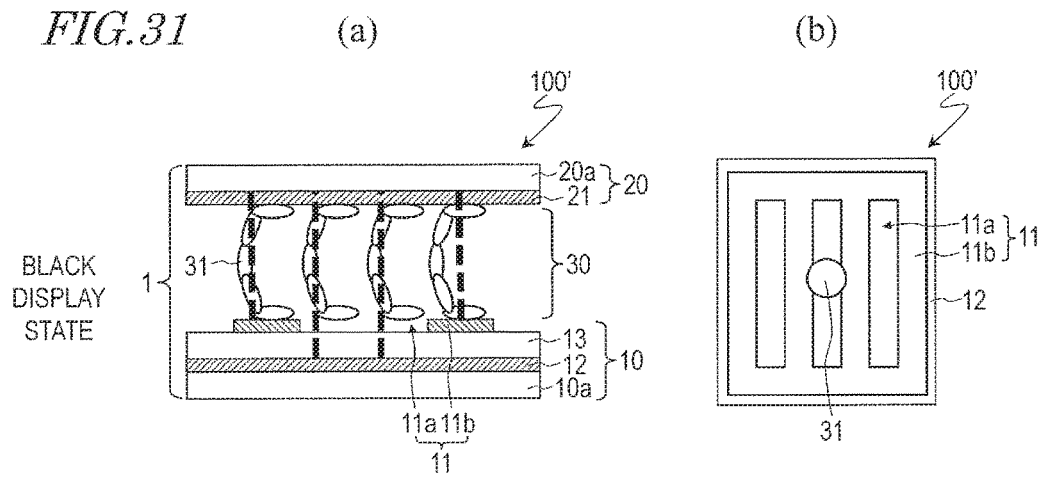
FIG.31 (a)  (b)
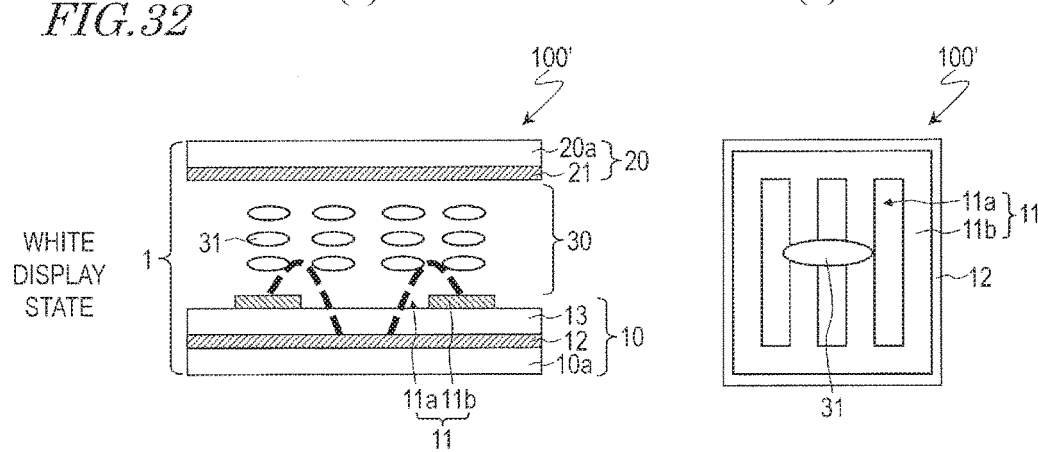
FIG.32 (a)  (b)

LIQUID CRYSTAL DISPLAY DEVICE

TECHNICAL FIELD

The present invention relates to a liquid crystal display device, and specifically, to a liquid crystal display device preferably usable as a see-through display device.

BACKGROUND ART

Recently, a see-through display device is a target of attention as a display device for information display or digital signage. Such a see-through display device allows the background (rear side of a display panel) to be seen through, and thus is capable of displaying information displayed on the display panel and the background in an overlapping manner. Therefore, the see-through display device has a splendid effect of appealing to potential customers and a splendid eye-catching effect. It has also been proposed to use the see-through display device for a showcase or a shop window.

In the case where a liquid crystal display device is used as a see-through display device, there is a bottleneck that the liquid crystal display device has a low light utilization factor. Such a low light utilization factor is caused by a color filter or a polarization plate provided in a general liquid crystal display device. The color filter and the polarization plate absorb light of a specific wavelength range or light of a specific polarization direction.

In such a situation, it is conceivable to use a liquid crystal display device of a field sequential system. In the field sequential system, the color of light directed from an illumination element toward a liquid crystal display panel is switched in a time division system to provide color display. Therefore, the color filter is not needed, and thus the light utilization factor is improved. However, the field sequential system requires a liquid crystal display device to have a high speed response.

Patent Document 1 and Patent Document 2 each disclose a liquid crystal display device having an improved response characteristic by including an electrode structure capable of generating a vertical electric field and a lateral electric field in a switched manner in a liquid crystal layer. In the liquid crystal display device disclosed in each of Patent Document 1 and Patent Document 2, a vertical electric field is generated in the liquid crystal layer in one of a transition from a black display state to a white display state (rise) and a transition from the white display state to the black display state (fall), and a lateral electric field (fringe field) is generated in the liquid crystal layer in the other of the rise and the fall. Therefore, a torque by voltage application acts on liquid crystal molecules in both of the rise and the fall, and thus a high speed response characteristic is provided.

Patent Document 3 also proposes a liquid crystal display device realizing a high speed response by causing an alignment control force, provided by an electric field, to act on the liquid crystal molecules in both of the rise and the fall.

CITATION LIST

Patent Literature

Patent Document 1: PCT Japanese National-Phase Laid-Open Patent Publication No. 2006-523850
Patent Document 2: Japanese Laid-Open Patent Publication No. 2002-365657
Patent Document 3: WO2013/001979

SUMMARY OF INVENTION

Technical Problem

However, it has been found that use of the liquid crystal display device disclosed in each of Patent Documents 1, 2 and 3 as a see-through display device causes a problem that the background is blurred (visually recognized double or seen double) for the reasons described below in detail and thus the display quality is declined. Patent Document 1, 2 or 3 does not described such a use (application as a see-through display device). The occurrence of the above-described problem is knowledge newly found by the present inventors.

The present invention made in light of the above-described problem has an object of providing a liquid crystal display device that has a high response characteristic and also provides a high display quality and is preferably usable as a see-through display device.

Solution to Problem

A liquid crystal display device in an embodiment according to the present invention includes a liquid crystal display panel including a first substrate and a second substrate facing each other, and a liquid crystal layer provided between the first substrate and the second substrate; the liquid crystal display device including a plurality of pixels arrayed in a matrix. The first substrate includes a first electrode provided in each of the plurality of pixels and a second electrode generating a lateral electric field in the liquid crystal layer together with the first electrode. The second substrate includes a third electrode provided to face the first electrode and the second electrode, the third electrode generating a vertical electric field in the liquid crystal layer together with the first electrode and the second electrode. The plurality of pixels each exhibit, in a switched manner, a black display state where black display is provided in a state where the vertical electric field is generated in the liquid crystal layer, a white display state where white display is provided in a state where the lateral electric field is generated in the liquid crystal layer, and a transparent display state where a rear side of the liquid crystal display panel is seen through in a state where no voltage is applied to the liquid crystal layer. A gray scale level group including gray scale levels from a lowest level to a highest level includes a white level corresponding to the white display state, a transparent level corresponding to the transparent display state and having a luminance higher than that of the white level, and a plurality of sub-transparent levels each having a luminance higher than that of the white level and lower than that of the transparent level.

In an embodiment the second electrode is provided below the first electrode with an insulating layer being provided between the first electrode and the second electrode.

In an embodiment, a potential difference between the first electrode and the second electrode at each of the plurality of sub-transparent levels is smaller than a potential difference between the first electrode and the second electrode at the white level; and a potential difference between the second electrode and the third electrode at each of the plurality of sub-transparent levels is smaller than a potential difference between the second electrode and the third electrode at the white level.

In an embodiment, at the plurality of sub-transparent levels, as the gray scale level is increased, a voltage applied to the second electrode is decreased while a voltage applied to the first electrode is kept the same.

In an embodiment, at the plurality of sub-transparent levels, as the gray scale level is increased, voltages applied to both of the first electrode and the second electrode are decreased.

In an embodiment, the gray scale level group includes 256 gray scale levels; and the number of the plurality of sub-transparent levels is 20 or greater.

In an embodiment, a potential difference between the first electrode and the second electrode at each of the gray scale levels in the gray scale level group is 60% or less of a potential difference between the second electrode and the third electrode in the black display state.

In an embodiment, at a gray scale level, in the gray scale level group, at which the potential difference between the first electrode and the second electrode is maximum, the potential difference between the first electrode and the second electrode is 30% or greater of the potential difference between the second electrode and the third electrode in the black display state.

In an embodiment, a voltage applied to the first electrode is decreased as the gray scale level is increased from the lowest level to the white level; and a voltage applied to the second electrode is kept the same as the gray scale level is increased from the lowest level to a halftone level, and is decreased as the gray scale level is increased from the halftone level to the white level.

In an embodiment, liquid crystal molecules in the liquid crystal layer assume twisted alignment in the transparent display state.

In an embodiment, the first electrode includes a plurality of slits extending in a predetermined direction; and in the white display state and the transparent display state, liquid crystal molecules at, and in the vicinity of, a central portion of the liquid crystal layer in a thickness direction are aligned to be generally perpendicular to the predetermined direction.

In an embodiment, the liquid crystal layer contains liquid crystal molecules having positive dielectric anisotropy.

In an embodiment, the liquid crystal display device having the above-described structure further includes an illumination element directing light of a plurality of colors including red light, green light and blue light in a switched manner toward the liquid crystal display panel.

In an embodiment, the liquid crystal display device provides color display in a field sequential system.

In an embodiment, the liquid crystal display panel does not include a color filter.

Advantageous Effects of Invention

An embodiment of the present invention provides a liquid crystal display device that has a high response characteristic and also provides a high display quality and is preferably usable as a see-through display device.

BRIEF DESCRIPTION OF DRAWINGS

FIG. 7 is a cross-sectional view showing an alignment state of the liquid crystal molecules 31 in a halftone display state of the liquid crystal display device 100.

FIG. 8 provides cross-sectional views schematically showing a liquid crystal display device 800 in a comparative example; FIG. 8(a) shows a black display state, and FIG. 8(b) shows a white display state.

FIG. 21(a) and FIG. 21(b) are each a graph provided to describe a mechanism by which the abnormal alignment change occurs.

FIG. 30 is a plan view schematically showing the another liquid crystal display device 100' in the embodiment according to the present invention.

FIG. 31(a) and FIG. 31(b) are respectively a cross-sectional view and a plan view showing an alignment state of liquid crystal molecules 31 in the black display state of the liquid crystal display device 100'.

FIG. 32(a) and FIG. 32(b) are respectively a cross-sectional view and a plan view showing an alignment state of the liquid crystal molecules 31 in the white display state of the liquid crystal display device 100'.

DESCRIPTION OF EMBODIMENTS

Hereinafter, embodiments of the present invention will be described with reference to the drawings. The present invention is not limited to any of the following embodiments.

Figure 1:
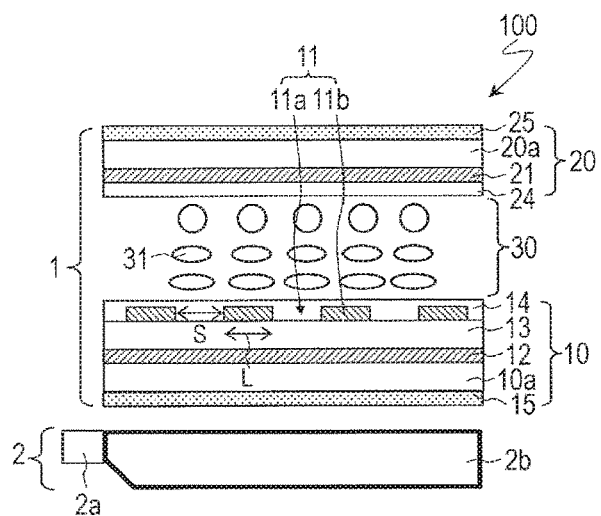
FIG. 1 is a cross-sectional view schematically showing a liquid crystal display device 100 in an embodiment according to the present invention.
Figure 2:
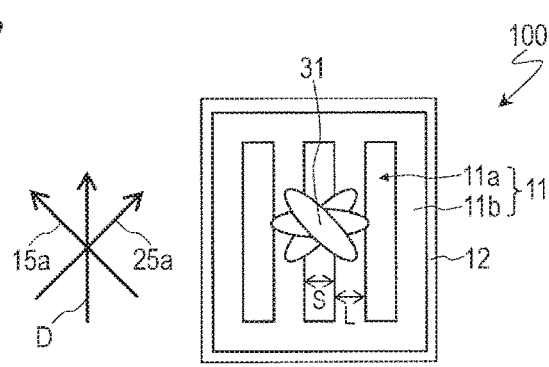
FIG. 2 is a plan view schematically showing the liquid crystal display device 100 in the embodiment according to the present invention.

With reference to FIG. 1 and FIG. 2, a liquid crystal display device 100 in this embodiment will be described. FIG. 1 is a cross-sectional view schematically showing the liquid crystal display device 100, and FIG. 2 is a plan view schematically showing the liquid crystal display device 100.

As shown in FIG. 1, the liquid crystal display device 100 includes a liquid crystal display panel 1 and an illumination element 2. The liquid crystal display device 100 includes a plurality of pixels arrayed in a matrix. As described below, the liquid crystal display device 100 provides color display in a field sequential system.

The liquid crystal display panel 1 includes a first substrate 10 and a second substrate 20 facing each other, and a liquid crystal layer 30 provided between the first substrate 10 and the second substrate 20. Among the first substrate 10 and the second substrate 20, the first substrate 10 located relatively on a rear side will be referred to as a "rear substrate", and the second substrate 20 located relatively on a front side will be referred to as a "front substrate".

The rear substrate 10 includes a first electrode 11 provided in each of the plurality of pixels, and a second electrode 12 generating a lateral electric field in the liquid crystal layer 30 together with the first electrode 11. The first electrode 11 is located above the second electrode 12 with an insulating layer 13 being provided therebetween. In other words, the second electrode 12 is located below the first electrode 11 with the insulating layer 13 being provided therebetween. In the following description, among the first electrode 11 and the second electrode 12, the first electrode 11 located relatively on the upper side will be referred to as an "upper electrode" and the second electrode 12 located relatively on the lower side will be referred to as a "lower electrode". The lower electrode 12, the insulating layer 13 and the upper electrode 11 are supported by a transparent substrate (e.g., glass substrate) 10a having an insulating property.

As shown in FIG. 1 and FIG. 2, the upper electrode 11 includes a plurality of slits 11a extending in a predetermined direction D and a plurality of branched portions 11b (comb teeth) extending parallel to the direction D in which the slits 11a extend (hereinafter, the direction D will also be referred to as a "slit direction"). The number of the slits 11a and the branched portions 11b are not limited to those shown in FIG. 1 and FIG. 2. There is no specific limitation on width S of each of the slits 11a. The width S of each slit 11a is typically 2 μm or greater and 10 μm or less. There is no specific limitation either on width L of each of the branched portions 11b. The width L of each branched portion 11b is typically 2 μm or greater and 10 μm or less. The upper electrode 11 is formed of a transparent conductive material (e.g., ITO).

The lower electrode 12 does not include any slit. Namely, the lower electrode 12 is a so-called solid electrode. The lower electrode 12 is formed of a transparent conductive material (e.g., ITO).

There is no specific limitation on the material of the insulating layer 13. The insulating layer 13 may be formed of, for example, an inorganic material such as silicon oxide ($SiO_2$), silicon nitride ($SiN_x$) or the like or an organic material such as a photosensitive resin or the like.

The front substrate 20 includes a third electrode 21 provided to face the upper electrode (first electrode) 11 and the lower electrode (second electrode) 12 (hereinafter, the third electrode will be referred to as a "counter electrode"). The counter electrode 21 is supported by a transparent substrate (e.g., glass substrate) 20a having an insulating property.

The counter electrode 21 generates a vertical electric field in the liquid crystal layer 30 together with the upper electrode 11 and the lower electrode 12. The counter electrode 21 is formed of a transparent conductive material (e.g., ITO).

Although not shown in FIG. 1, a dielectric layer (overcoat layer) maybe formed on the counter electrode 21. The overcoat layer is provided to weaken the vertical electric field unavoidably generated when the lateral electric field is generated. The overcoat layer is formed of, for example, a photosensitive resin.

The liquid crystal layer 30 contains liquid crystal molecules 31 having positive dielectric anisotropy. Namely, the liquid crystal layer 30 is formed of a positive liquid crystal material. In FIG. 1 and FIG. 2, the liquid crystal molecules 31 are aligned in the state where no voltage is applied to the liquid crystal layer 30.

The liquid crystal display panel 1 further includes a pair of horizontal alignment films 14 and 24 provided to face each other with the liquid crystal layer 30 being provided therebetween. One of the pair of horizontal alignment films 14 and 24, specifically, the horizontal alignment film 14 (hereinafter, may be referred to as a "first horizontal alignment film"), is formed on a surface of the rear substrate 10 on the side of the liquid crystal layer 30. The other of the pair of horizontal alignment films 14 and 24, specifically, the horizontal alignment film 24 (hereinafter, may be referred to as a "second horizontal alignment film"), is formed on a surface of the front substrate 20 on the side of the liquid crystal layer 30.

The first horizontal alignment film 14 and the second horizontal alignment film 24 are each alignment-processed and thus have an alignment control force that aligns the liquid crystal molecules 31 in the liquid crystal layer 30 in a predetermined direction (referred to as a "pretilt direction"). The alignment process may be, for example, a rubbing process or an optical alignment process.

The pretilt directions respectively controlled by the first horizontal alignment film 14 and the second horizontal alignment film 24 are set such that the liquid crystal molecules 31 assume twisted alignment in the state where no voltage is applied to the liquid crystal layer 30 (in the state where no electric field is generated). Specifically, the pretilt directions respectively controlled by the first horizontal alignment film 14 and the second horizontal alignment film 24 have an angle of about 45 degrees with respect to the slit direction D. The pretilt direction controlled by the second horizontal alignment film 24 has an angle of 90 degrees with respect to the pretilt direction controlled by the first horizontal alignment film 14. Therefore, in the state where no voltage is applied to the liquid crystal layer 30, the liquid crystal molecules 31 are twisted at 90 degrees.

The liquid crystal display panel 1 further includes a pair of polarization plates 15 and 25 provided to face each other with the liquid crystal layer 30 being provided therebetween. One of the pair of polarization plates 15 and 25, specifically, the polarization plate 15 (hereinafter, also referred to a "first polarization plate"), has a transmission axis (polarization axis) 15a, and the other of the pair of polarization plates 15 and 25, specifically, the polarization plate 25 (hereinafter, also referred to as a "second polarization plate"), has a transmission axis (polarization axis) 25a. As shown in FIG. 2, the transmission axes 15a and 25a are generally perpendicular to each other. Namely, the polarization plates 15 and 25 are located in a crossed-Nicols state. The transmission axis 15a of the first polarization plate 15 and the transmission axis 25a of the second polarization plate 25 are generally parallel or generally perpendicular to the pretilt directions respectively controlled by the first horizontal alignment film 14 and the second horizontal alignment film 24. Therefore, the transmission axis 15a of the first polarization plate 15 and the transmission axis 25a of the second polarization plate 25 each have an angle of about 45 degrees with respect to the slit direction D.

The illumination element (also referred to as a "backlight unit") 2 is located on the rear side of the liquid crystal display panel 1. The illumination element 2 is capable of directing light of a plurality of colors including red light, green light and blue light in a switched manner toward the liquid crystal display panel 1.

The illumination element 2 may be, for example, of an edge light system as shown in FIG. 1. The illumination element 2 of the edge light system includes a light source unit 2a and a light guide plate 2b. The light source unit 2a may emit light of a plurality of colors including red light, green light and blue light. The light source unit 2a includes, for example, a red LED, a green LED and a blue LED. The light guide plate 2b guides the color light emitted from the light source unit 2a toward the liquid crystal display panel 1.

The liquid crystal display device 100 provides color display in the field sequential system. Therefore, the liquid crystal display panel 1 does not include any color filter.

When a predetermined voltage is applied between the upper electrode 11 and the lower electrode 12 (namely, when a predetermined potential difference between the upper electrode 11 and the lower electrode 12 is given), a lateral electric field (fringe field) is generated in the liquid crystal layer 30. The "lateral electric field" is an electric field including a component parallel to the substrate surface. The direction of the lateral electric field generated by the upper electrode 11 and the lower electrode 12 is generally perpendicular to the slit direction D.

By contrast, when a predetermined voltage is applied between the counter electrode 21 and the upper electrode 11/the lower electrode 12 (namely, when a predetermined potential difference between the counter electrode 21 and the upper electrode 11/the lower electrode 12 is given), a vertical electric field is generated. The "vertical electric field" is an electric field directed generally parallel to the normal to the substrate surface.

The liquid crystal display device 100 has a structure capable of controlling the strength of each of the lateral electric field and the vertical electric field for each of the pixels. Typically, the liquid crystal display device 100 has a structure capable of supplying a different voltage to each of the upper electrode 11 and the lower electrode 12 on a pixel-by-pixel basis. Specifically, the upper electrode 11 and the lower electrode 12 are both provided for each of the pixels, and each pixel includes a switching element (e.g., thin film transistor; not shown) electrically connected with the upper electrode 11 and a switching element (e.g., thin film transistor; not shown) electrically connected with the lower electrode 12. Predetermined voltages are respectively supplied to the upper electrode 11 and the lower electrode 12 via the corresponding switching elements. The counter electrode 21 is formed as a single continuous conductive film corresponding to all the pixels. Therefore, a common potential is applied to the counter electrode 21 in all the pixels.

Figure 3:
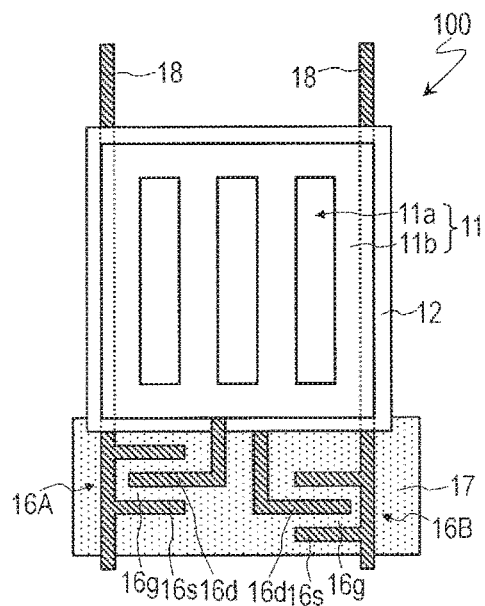
FIG. 3 is a plan view showing an example of specific line structure of a rear substrate 10 in the liquid crystal display device 100.

FIG. 3 shows an example of specific line structure of the rear substrate 10. In the structure shown in FIG. 3, each pixel includes a first TFT 16A corresponding to the upper electrode 11 and a second TFT 16B corresponding to the lower electrode 12.

A gate electrode 16g of each of the first TFT 16A and the second TFT 16B is electrically connected with a gate bus line (scanning line) 17. A portion of the gate bus line 17 that overlaps a channel region of each of the first TFT 16A and the second TFT 16B acts as the gate electrodes 16g. Source electrodes 16s of the first TFT 16A and the second TFT 16B are electrically connected with source bus lines (signal line) 18 respectively. A portion branched from each of the source bus lines 18 acts as the source electrode 16s. A drain electrode 16d of the first TFT 16A is electrically connected with the upper electrode 11. By contrast, a drain electrode 16d of the second TFT 16B is electrically connected with the lower electrode 12. The line structure of the rear substrate 10 is not limited to that shown in FIG. 3.

In the liquid crystal display device 100 in this embodiment, each of the plurality of pixels may exhibit, in a switched manner, a "black display state" in which black display is provided in the state where a vertical electric field is generated in the liquid crystal layer 30, a "white display state" in which white display is provided in the state where a lateral electric field is generated in the liquid crystal layer 30, and a "transparent display state" in which the rear side of the liquid crystal display panel 1 (i.e., background) is seen through in the state where no voltage is applied to the liquid crystal layer 30.

Figure 4:
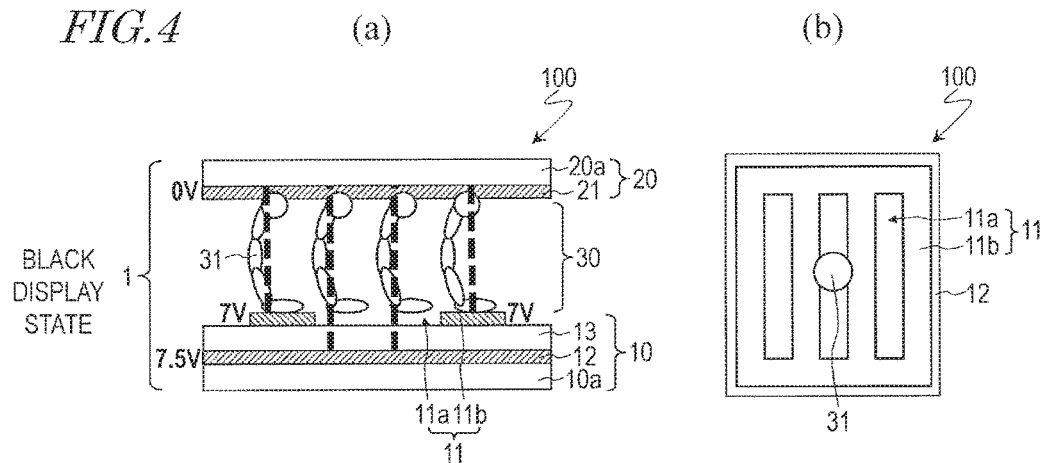
FIG. 4(a) and FIG. 4(b) are respectively a cross-sectional view and a plan view showing an alignment state of liquid crystal molecules 31 in a black display state of the liquid crystal display device 100.
Figure 5:
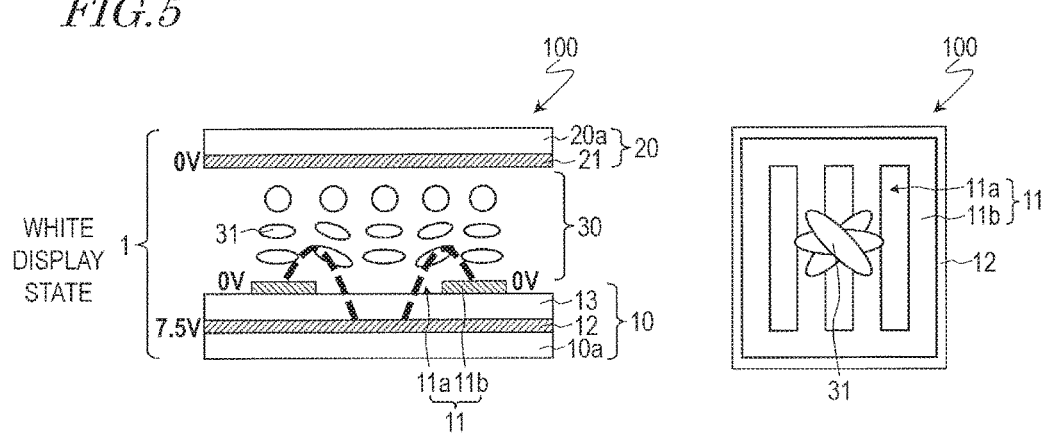
FIG. 5(a) and FIG. 5(b) are respectively a cross-sectional view and a plan view showing an alignment state of the liquid crystal molecules 31 in a white display state of the liquid crystal display device 100.
Figure 6:
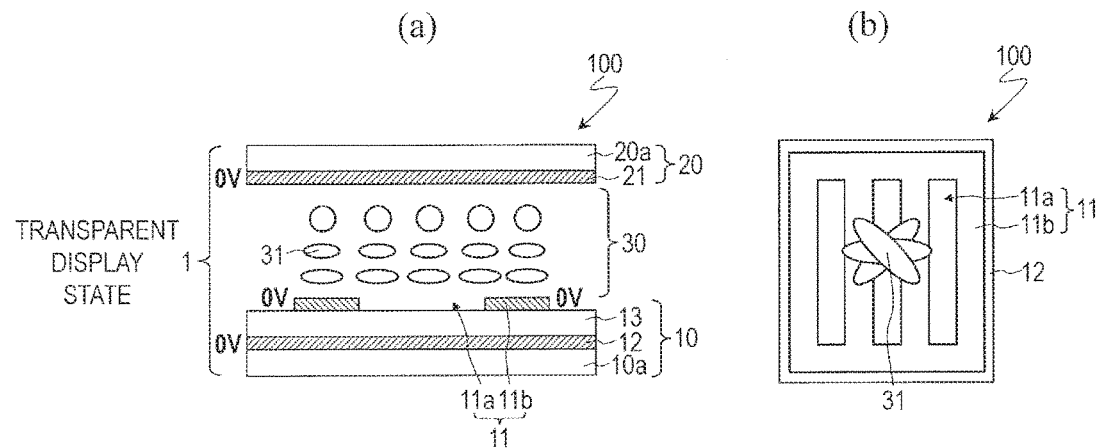
FIG. 6(a) and FIG. 6(b) are respectively a cross-sectional view and a plan view showing an alignment state of the liquid crystal molecules 31 in a transparent display state of the liquid crystal display device 100.

Hereinafter, with reference to FIG. 4, FIG. 5 and FIG. 6, the black display state, the white display state and the transparent display state will be described in more detail.

FIG. 4(a) and FIG. 4(b) each show an alignment state of the liquid crystal molecules 31 in the black display state. In the black display state, a predetermined voltage is applied between the counter electrode 21 and the upper electrode 11/the lower electrode 12 (for example, potentials of 7 V, 7.5 V and 0 V are given to the upper electrode 11, the lower electrode 12 and the counter electrode 21 respectively), and a vertical electric field is generated in the liquid crystal layer 30. FIG. 4(a) schematically shows lines of electric force in this state with dashed lines.

In the black display state, as shown in FIG. 4(a) and FIG. 4(b), the liquid crystal molecules 31 in the liquid crystal layer 30 are aligned to be generally vertical to the substrate surface (surfaces of the rear substrate 10 and the front substrate 20) (namely, aligned to be generally parallel to the normal to the liquid crystal layer 30). The liquid crystal molecules 31 in the close vicinity of the first horizontal alignment film 14 and the second horizontal alignment film 24 are strongly influenced by the alignment control force of the first horizontal alignment film 14 and the second horizontal alignment film 24 and thus are kept aligned to be generally parallel to the substrate surface. However, such liquid crystal molecules 31 are generally parallel or generally perpendicular to the transmission axis 15a of the first polarization plate 15, and thus do not give phase difference almost at all to light incident on the liquid crystal layer 30 via the first polarization plate 15 and do not decrease the contrast ratio almost at all.

FIG. 5(a) and FIG. 5(b) each show an alignment state of the liquid crystal molecules 31 in the white display state. In the white display state, a predetermined voltage is applied between the upper electrode 11 and the lower electrode 12 (for example, potentials of 0 V, 7.5 V and 0 V are given to the upper electrode 11, the lower electrode 12 and the counter electrode 21 respectively), and a lateral electric field (fringe field) is generated in the liquid crystal layer 30. FIG. 5(a) schematically shows lines of electric force in this state with dashed lines.

In the white display state, as shown in FIG. 5(a) and FIG. 5(b), the liquid crystal molecules 31 in the liquid crystal layer 30 are aligned to be generally parallel to the substrate surface (namely, aligned to be generally vertical to the normal to the liquid crystal layer 30). More specifically, the liquid crystal molecules 31 in the vicinity of the first horizontal alignment film 14 and the liquid crystal molecules 31 in the vicinity of the second horizontal alignment film 24 are aligned to have an angle of about 90 degrees with respect to each other. As a result, the liquid crystal molecules 31 at, and in the vicinity of, a central portion of the liquid crystal layer 30 in a thickness direction are aligned to be generally perpendicular to the direction D in which the slits 11a of the upper electrode 11 extend (generally perpendicular in the slit direction D). Therefore, the average alignment direction of the bulk liquid crystal portion is generally perpendicular to the slit direction D (namely, has an angle of about 45 degrees with respect to the transmission axes 15a and 25a of the first polarization plate 15 and the second polarization plate 25).

FIG. 6(a) and FIG. 6(b) each show an alignment state of the liquid crystal molecules 31 in the transparent display state. In the transparent display state, no voltage is applied to the liquid crystal layer 30 (for example, a potential of 0 V is given to all of the upper electrode 11, the lower electrode 12 and the counter electrode 21), and neither a vertical electric field nor a lateral electric field is generated in the liquid crystal layer 30.

In the transparent display state, as shown in FIG. 6(a) and FIG. 6(b), the liquid crystal molecules 31 in the liquid crystal layer 30 assume twisted alignment. Namely, the liquid crystal molecules 31 are aligned to be generally parallel to the substrate surface (namely, generally vertical to the normal to the liquid crystal layer 30). The liquid crystal molecules 31 in the vicinity of the first horizontal alignment film 14 and the liquid crystal molecules 31 in the vicinity of the second horizontal alignment film 24 are aligned to have an angle of about 90 degrees with respect to each other. As a result, the liquid crystal molecules 31 at, and in the vicinity of, the central portion of the liquid crystal layer 30 in the thickness direction are aligned to be generally perpendicular to the slit direction D. Therefore, the average alignment direction of the bulk liquid crystal portion is generally perpendicular to the slit direction D (namely, has an angle of about 45 degrees with respect to the transmission axes 15a and 25a of the first polarization plate 15 and the second polarization plate 25). Each of the pixels in the liquid crystal display device 100 has a highest light transmittance in this transparent display state (namely, higher light transmittance than in the black display state or the white display state).

Each of the plurality of pixels in the liquid crystal display device 100 may exhibit a "halftone display state" in which display is provided at a luminance corresponding to a halftone as shown in FIG. 7, in addition to the black display state, the white display state and the transparent display state described above. In the halftone display state, a desired transmittance may be realized by adjusting the strength of the lateral electric field (fringe field) generated in the liquid crystal layer 30 (by, for example, giving a potential of 0 V to the counter electrode 21, a potential of 7.5 V to the lower electrode 12, and a potential exceeding 0 V and less than 7 V to the upper electrode 11).

As described above, the liquid crystal display device 100 in this embodiment provides color display in the field sequential system. Therefore, the liquid crystal display panel 1 does not need a color filter. This improves the light utilization factor. Also in the liquid crystal display device 100, a vertical electric field is generated in the liquid crystal layer 30 in the black display state and a lateral electric field is generated in the liquid crystal layer 30 in the white display state. Therefore, a torque by voltage application acts on liquid crystal molecules 31 in both of the fall (transition from the white display state to the black display state) and the rise (transition from the black display state to the white display state), and thus a high speed response characteristic is provided.

In the liquid crystal display device 100 in this embodiment, the pixels may each exhibit the transparent display state in which no voltage is applied to the liquid crystal layer 30, in addition to the black display state and the white display state. Displaying the background in the transparent display prevents the problem that the background is blurred (visually recognized double). Hereinafter, reasons why this problem (the display is blurred and visually recognized double) occurs in the liquid crystal display devices in Patent Documents 1 through 3 will be described by way of a liquid crystal display device in a comparative example.

FIG. 8(a) and FIG. 8(b) respectively show a liquid crystal display device 800 in a comparative example in the black display state and the white display state. The liquid crystal display device 800 in the comparative example has the same structure as that shown in FIG. 1 and FIG. 2 of Patent Document 3.

The liquid crystal display device 800 includes an array substrate 810, a counter substrate 820 and a liquid crystal layer 830 provided therebetween. The array substrate 810 includes a glass substrate 810a, and a lower electrode 812, an insulating layer 813 and a pair of comb electrodes (upper electrodes) 817 and 828 stacked on the glass substrate 810a in this order. Meanwhile, the counter substrate 820 includes a glass substrate 820a and a counter electrode 821 provided on the glass substrate 820a.

The liquid crystal layer 830 contains liquid crystal molecules 831 having positive dielectric anisotropy. In the liquid crystal display device 800, the liquid crystal molecules 831 in the liquid crystal layer 830 assume a vertical alignment state in the state where no voltage is applied.

In the liquid crystal display device 800 in the comparative example, for proving black display, a predetermined voltage is applied between the counter electrode 821 and the lower electrode 812/upper electrodes (pair of comb electrodes) 817 and 818 (for example, a potential of 7 V is given to the counter electrode 821, and a potential of 14 V is given to the lower electrode 812 and the upper electrodes 817 and 818), and a vertical electric field is generated in the liquid crystal layer 830. As a result, as shown in FIG. 8(a), the liquid crystal molecules 831 are aligned to be generally vertical to the substrate surface.

In the liquid crystal display device 800 in the comparative example, for proving white display, a predetermined voltage is applied between the pair of comb electrodes 817 and 818 (for example, a potential of 0 V is given to one of the comb electrodes, specifically, the comb electrode 817, and a potential of 14 V is given to the other of the comb electrodes, specifically, the comb electrode 818), and a lateral electric field is generated in the liquid crystal layer 830. As a result, as shown in FIG. 8(*b*), the liquid crystal molecules 831 are aligned as being inclined with respect to the normal to the substrate surface.

Figure 9:
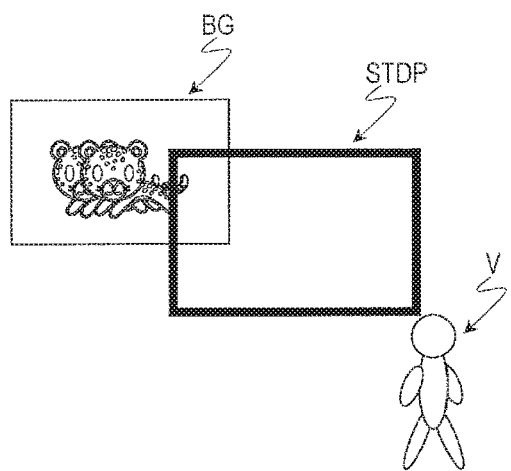
FIG. 9 schematically shows that the display is blurred (visually recognized double).

In the case where the liquid crystal display device 800 in the comparative example is simply used as a see-through display device, see-through display is provided, namely, display in which the background is seen though is provided, in the white display state in which the light transmittance of the pixels is high. However, the white display state is realized by applying a voltage to the liquid crystal layer 830 to align the liquid crystal molecules 830. Therefore, there occurs a refractive index distribution in each pixel. As a result, light L from the rear side is scattered (namely, the advancing direction of the light L is changed; see FIG. 8(*b*)) by the refractive index distribution), and thus the background is blurred. As a result, as shown in FIG. 9, a viewer V viewing the background BG via a see-through display device STDP visually recognizes the background double.

As described above, when see-through display is provided in the white display state in which a voltage is applied to the liquid crystal layer, the display is blurred (visually recognized double). By contrast, the liquid crystal display device 100 in this embodiment provides background display (see-through display) in the state where no voltage is applied to the liquid crystal layer 30 (in the transparent display state). Therefore, a viewer viewing the background via the liquid crystal display device 100 visually recognizes the background clearly. Thus, the display is prevented from being blurred (from being visually recognized double), and the quality of the see-through display is improved.

In the liquid crystal display device 100 in this embodiment, a gray scale level group including gray scale levels from the lowest level to the higher level (set of all the gray scale levels) includes a "white level" corresponding to the white display state, a "transparent level" corresponding to the transparent display state and having a higher luminance than that of the white level, and a plurality of "sub-transparent levels" each having a luminance higher than that of the white level but lower than that of the transparent level. Since the gray scale level group is set in this manner, the decline in the display quality caused by a difference between the white level and the transparent level is suppressed. Hereinafter, this will be described more specifically.

A driving circuit for a general liquid crystal display device includes an 8-bit driver IC, and generates an output voltage for 256 levels (levels 0 to 255). In a general liquid crystal display device, level 0 is assigned to the black display state, levels 1 through 254 are assigned to the halftone display state, and level 255 is assigned to the white display state.

Figure 10:
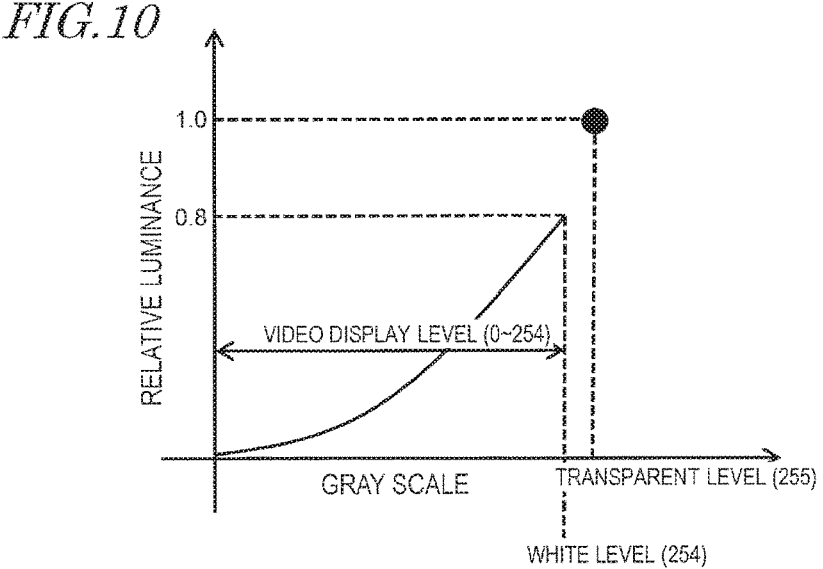
FIG. 10 is a graph showing a simple example of gray scale level settings.

Now, it is assumed that in the liquid crystal display device 100 in this embodiment, the gray scale level group is set not to include the above-described sub-transparent levels. In this case, for example, level 0 (lowest level) is assigned to the black display state, levels 1 to 253 are assigned to the halftone display state, level 254 is assigned to the white display state, and level 255 is assigned to the transparent display state (namely, as shown in FIG. 10, levels 0 to 254 are set to video display levels, and level 255 is set to the transparent level). In this manner, the black display state, the halftone display state, the white display state and the transparent display state are switched to each other. However, in this case, noise may be generated in display for the following reason.

For, for example, storing a moving image file, it is common to compress the file because the file has a very large capacity without being compressed. For displaying the moving image file, the compressed file is decompressed before being displayed. At this point, it is almost impossible to decompress the file with no error. Therefore, there is a slight error between the decompressed file and the original file. This may result in the following situation: at, or in the vicinity of, a border between a region where the video is to be displayed (video display region) and a region where transparent display is provided (transparent display region), pixels that should exhibit the transparent display state but actually exhibit the white display state are present. In the liquid crystal display device 100, the luminance of the pixels in the transparent display state and the luminance of the pixels in the white display state may be significantly different from each other. For example, the present inventors produced a panel of certain specifications for a test. In this panel, as shown in FIG. 10, the luminance at the transparent level was higher by about 20% than the luminance at the white level. Therefore, if pixels that should exhibit the transparent display state but actually exhibit the white display state are present in the transparent display region, such pixels are visually recognized as noise clearly because these pixels provide darker display than pixels around these pixels.

Figure 11:
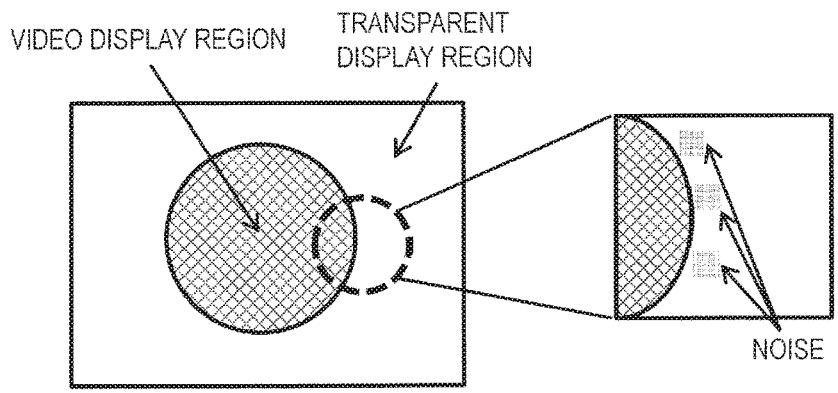
FIG. 11 shows a state where noise is generated.

FIG. 11 shows display when such noise is generated. In the example shown in FIG. 11, the circular region at the center of the display screen is the video display region, and the remaining region is the transparent display region. As shown in FIG. 11, noise is visually recognized at, or in the vicinity of, the border between the video display region and the transparent display region.

Such a decline in the display quality is a problem unique to a liquid crystal display device in which the pixels are capable of providing the transparent display state in addition to the black display state and the white display state. In a general liquid crystal display device, there is no large luminance difference between level 254 and level 255. Therefore, even if an error is caused by the compression and decompression of a moving image file and as a result, pixels that should display level 255 actually display level 254, such a difference is not conspicuous almost at all. By contrast, in a liquid crystal display device in which the pixels are capable of exhibiting the transparent display state, the luminance difference between the white display state at level 254 and the transparent display state at level 255 is significant. Therefore, if there are pixels exhibiting level 254 or less in the transparent display state, noise is not likely to be conspicuous.

In the liquid crystal display device 100 in this embodiment, as described above, the gray scale level group including the gray scale levels from the lowest level to the highest level includes the plurality of sub-transparent levels having a luminance higher than that of the white level but lower than that of the transparent level. Namely, the gray scale level group is set to include levels having an intermediate luminance between the luminance at the white level and the luminance at the transparent level (set to include the sub-transparent levels). Therefore, the above-described noise is not visually recognized easily.

Figure 12:
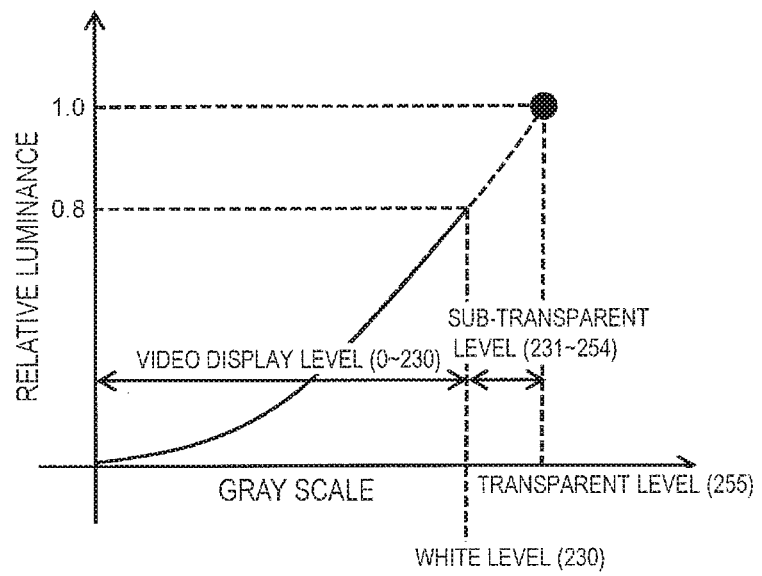
FIG. 12 is a graph showing an example of gray scale level settings in the liquid crystal display device 100 in an embodiment according to the present invention.

FIG. 12 shows an example of gray scale level settings in the liquid crystal display device 100 in this embodiment. In the example shown in FIG. 12, levels 0 to 230 are set to the video display levels, level 255 is set to the transparent level, and levels 231 to 254 are set to the sub-transparent levels. Namely, level 0 (lowest level) is assigned to the black display state, levels 1 to 229 are assigned to the halftone display state, level 230 is assigned to the white display state, level 255 is assigned to the transparent display state, and levels 231 to 254 are assigned to a display state corresponding to the sub-transparent levels (hereinafter, this display state will be referred to as a "sub-transparent display state").

It is now assumed that the luminance at the white level is about 0.8 times the luminance at the transparent level. In this case, as shown in FIG. 12, level 230 may be set to the white level, level 255 may be set to the transparent level, and levels 231 to 254 may be set to the sub-transparent levels, so that the white level and the transparent level are connected with each other smoothly with a y characteristic of $\gamma=2.2$.

In the case where the level settings are made in this manner, even if pixels that should display the transparent level actually display a level other than level 255 for some reason (e.g., error caused at the time of compression or decompression of the moving image file), noise is not visually recognized easily (the level of the noise is at least equivalent to that in a general liquid crystal display device).

As described above, in the liquid crystal display device 100 in this embodiment, each pixel may provide the black display state, the white display state and the transparent display state in a switched manner. A conventional see-through display device provides see-through display in either the black display state or the white display state regardless of the type thereof (liquid crystal display device, PDLC display, organic EL display, etc.) (namely, the gray scale level corresponding to the black display state or the white display state is assigned to the see-through display). Therefore, see-through display is not provided at an applied voltage different from both of the voltage for the black display state and the voltage for the white display state. By contrast, in the liquid crystal display device 100 in this embodiment, each pixel may exhibit the black display state, the white display state, and also the transparent display state provided at a voltage different from both of the voltage for the black display state and the voltage for the white display state. Therefore, the display is prevented from being blurred (from being visually recognized double). In addition, in the liquid crystal display device 100 in this embodiment, the gray scale level group including the gray scale levels from the lowest level to the highest level includes a plurality of sub-transparent levels having a luminance higher than that of the white level but lower than that of the transparent level. Therefore, the decline in the display quality caused by the luminance difference between the white level and the transparent level (noise being visually recognized) is suppressed.

Now, a method for realizing the sub-transparent state will be described.

In the liquid crystal display device 100 in this embodiment, the potential difference between the upper electrode 11 and the lower electrode 12 at each of the plurality of sub-transparent levels (namely, in the sub-transparent display state) is smaller than the potential difference between the upper electrode 11 and the lower electrode 12 at the white level. The potential difference between the lower electrode 12 and the counter electrode 21 at each of the plurality of sub-transparent levels is smaller than the potential difference between the lower electrode 12 and the counter electrode 21 at the white level. The sub-transparent display state is realized by setting the potential differences between the upper electrode (first electrode) 11, the lower electrode (second electrode) 12 and the counter electrode (third electrode) 21 in this manner. Hereinafter, this will be described in more detail by way of specific examples.

Figure 13:
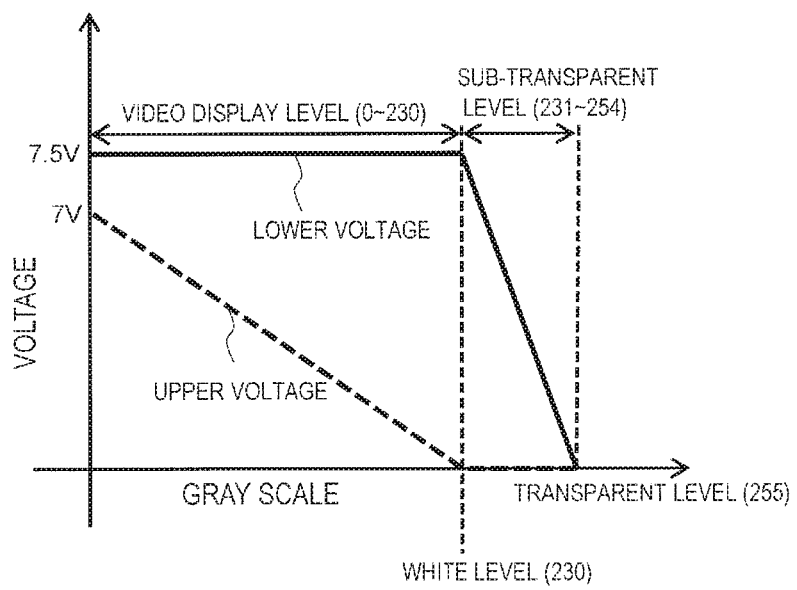
FIG. 13 is a graph showing an example of voltage settings (relationship between the upper voltage/the lower voltage and the gray scale level) for realizing a sub-transparent display state.
Figure 14:
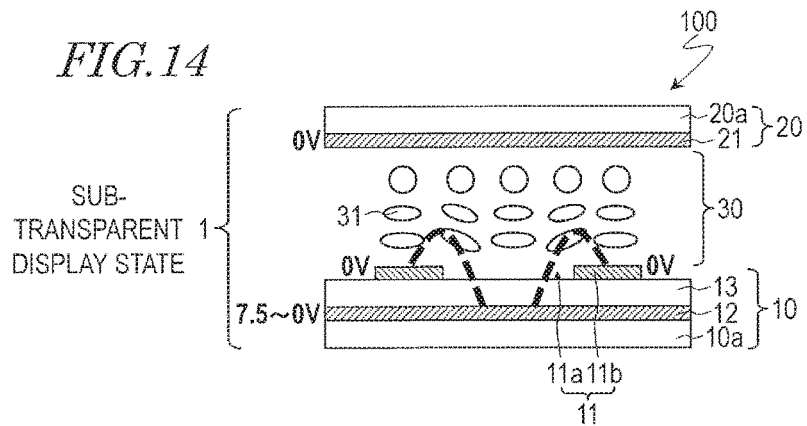
FIG. 14 is a cross-sectional view showing an alignment state of the liquid crystal molecules 31 in the sub-transparent display state.

FIG. 13 shows an example of relationship between a voltage applied to the upper electrode 11 (upper voltage)/a voltage applied to the lower electrode 12 (lower voltage) and the gray scale levels. FIG. 14 shows an alignment state of the liquid crystal molecules 31 in the sub-transparent display state realized by the example in FIG. 13. Although not shown in FIG. 13, the voltage applied to the counter electrode 21 (counter voltage) is 0 V at all the gray scale levels.

In the example shown in FIG. 13, the upper voltage and the lower voltage in the black display state are respectively 7 V and 7.5 V. In a region of the video display levels (levels 0 to 230), as the gray scale level is increased, the upper voltage is decreased while the lower voltage is kept the same. Specifically, the upper voltage is changed (decreased) from 7 V to 0 V while the lower voltage is kept at 7.5 V. By contrast, in a region of the plurality of sub-transparent levels (levels 231 to 254) and the transparent level (level 255), as the gray scale level is increased, the lower voltage is decreased while the upper voltage is kept the same. Specifically, the lower voltage is changed (decreased) from 7.5 V to 0 V while the upper voltage is kept at 0 V.

As described above, in the region of the plurality of sub-transparent levels, as the gray scale level is increased, the potential difference between the upper electrode 11 and the lower electrode 12 is decreased, and the potential difference between the lower electrode 12 and the counter electrode 21 is also decreased. Therefore, the alignment state of the liquid crystal molecules 31 is changed from an alignment state close to the white display state to an alignment state close to the transparent display state. Thus, as the gray scale level is increased, the luminance in the sub-transparent display state is changed from a luminance close to that of the white display state to a luminance close to that of the transparent display state.

The sub-transparent display state is realized as described above. In the example shown in FIG. 13 (having a structure in which in the region of the plurality of sub-transparent levels, as the gray scale level is increased, the lower voltage is decreased while the upper voltage is kept the same), a relatively strong fringe field (lateral electric field) is left at levels, among the plurality of sub-transparent levels), which are close to the white level as shown in FIG. 14. Therefore, even at the sub-transparent levels, a response speed that is high to a certain extent is provided.

Figure 15:
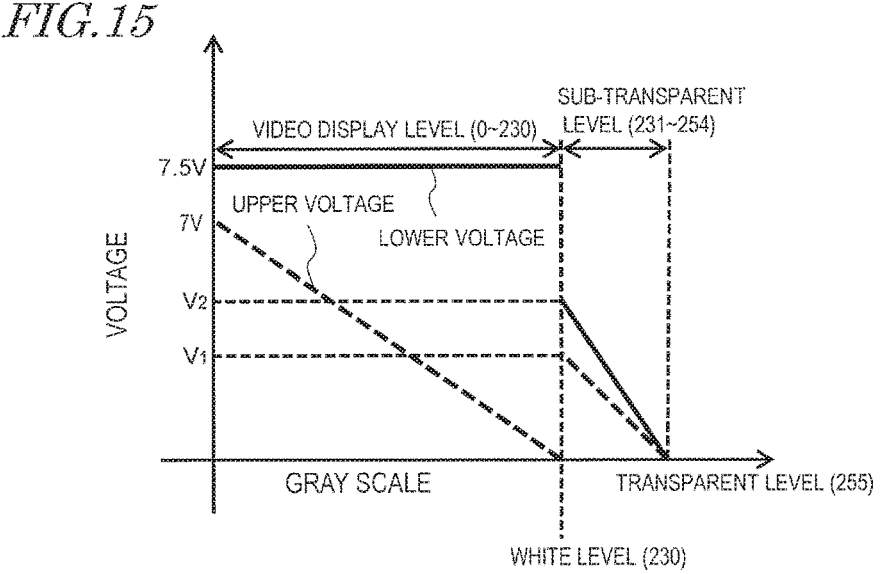
FIG. 15 is a graph showing another example of voltage settings (relationship between the upper voltage/the lower voltage and the gray scale level) for realizing the sub-transparent display state.
Figure 16:
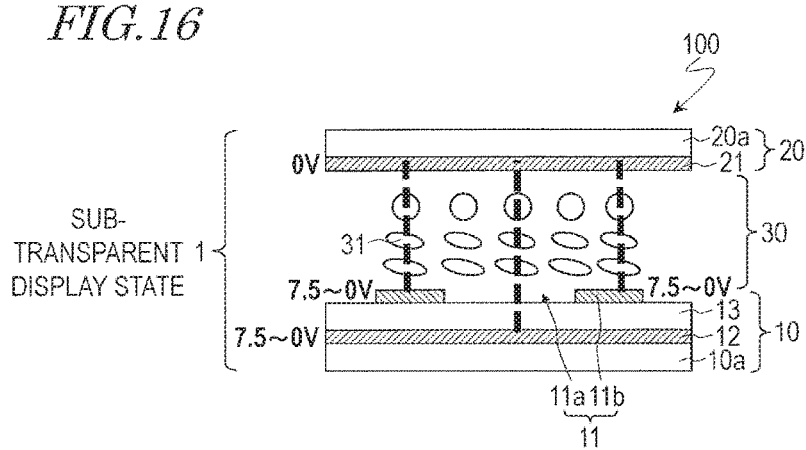
FIG. 16 is a cross-sectional view showing an alignment state of the liquid crystal molecules 31 in the sub-transparent display state.

FIG. 15 shows another example of relationship between a voltage applied to the upper electrode 11 (upper voltage)/the voltage applied to the lower electrode 12 (lower voltage) and the gray scale levels. FIG. 16 shows an alignment state of the liquid crystal molecules 31 in the sub-transparent display state realized by the example in FIG. 15. Although not shown in FIG. 15, the voltage applied to the counter electrode 21 (counter voltage) is 0 V at all the gray scale levels.

In the example shown in FIG. 15, the upper voltage and the lower voltage in the black display state are respectively 7 V and 7.5 V. In the region of the video display levels (levels 0 to 230), as the gray scale level is increased, the upper voltage is decreased while the lower voltage is kept the same. Specifically, the upper voltage is changed (decreased) from 7 V to 0 V while the lower voltage is kept at 7.5 V. In the meantime, in the region of the plurality of sub-transparent levels (levels 231 to 254) and the transparent level (level 255), as the gray scale level is increased, both of the upper voltage and the lower voltage are decreased. Specifically, the upper voltage is decreased from predetermined voltage $V_1$ to 0 V while the lower voltage is changed (decreased) from predetermined voltage $V_2$ to 0 V. Specifically, the upper voltage is changed (decreased) from predetermined voltage $V_1$ to 0 V while the lower voltage is changed (decreased) from predetermined voltage $V_2$ to 0 V. The predetermined voltages $V_1$ and $V_2$ may each be set to an appropriate value exceeding 0 V and less than 7.5 V ($V_1<V_2$). Namely, as the gray scale level is increased, the difference between the upper voltage and the lower voltage is decreased while the relationship that the lower voltage is higher than the upper voltage is maintained.

As described above, in the example shown in FIG. 15 also, in the region of the plurality of sub-transparent levels, as the gray scale level is increased, the potential difference between the upper electrode 11 and the lower electrode 12 is decreased, and the potential difference between the lower electrode 12 and the counter electrode 21 is also decreased. Therefore, the alignment state of the liquid crystal molecules 31 is changed from an alignment state close to the white display state to an alignment state close to the transparent display state. Thus, as the gray scale level is increased, the luminance in the sub-transparent display state is changed from a luminance close to that of the white display state to a luminance close to that of the transparent display state.

As described above, the sub-transparent display state is realized also in the example shown in FIG. 15. In the example shown in FIG. 15 (having a structure in which in the region of the plurality of sub-transparent levels, as the gray scale level is increased, both of the upper voltage and the lower voltage are decreased), a uniform vertical electric field is applied to a plane parallel to the display plane. Therefore, the liquid crystal molecules 31 are aligned uniformly in the plane. Thus, the refractive index distribution is not easily caused, and diffraction caused by the refractive index difference in the plane is not easily caused. As a result, clearer transparent display is realized.

It should be noted that in the example shown in FIG. 15, the lateral electric field (fringe field) applied to the liquid crystal layer 30 at the sub-transparent levels is weaker than the lateral electric field applied in the example shown in FIG. 13. This may decrease the response speed at the sub-transparent levels. For this reason, in the case where response speed is important, it is considered to be preferable to adopt the settings shown in FIG. 13. In the case where clearness of the transparent display is important, it is considered to be preferable to adopt the settings shown in FIG. 15.

In the above example, levels 231 to 254 are set to the sub-transparent levels. The number of the sub-transparent levels is not limited to the above. The luminance difference between the white level and the transparent level (ratio of the luminance at the white level with respect to the luminance at the transparent level) may vary in accordance with the specifications of the liquid crystal display device 100. Thus, the number of the sub-transparent levels may be set, in accordance with the luminance difference between the white level and the transparent level, such that the white level and the transparent level are connected with each other smoothly (namely, such that a desired y characteristic is provided). In the case of the 256-level display system (in the case where the gray scale level group includes 256 gray scale levels), the number of the sub-transparent levels is preferably 20 or greater from the point of view of connecting the white level and the transparent level with each other smoothly.

However, in the case where the number of the sub-transparent levels is made too large in order to realize a y characteristic that smooths the connection, the number of levels assigned to the video display (number of the video display levels) is decreased. Therefore, in the case where the number of the video display levels is important, the number of the sub-transparent levels may be decreased.

Figure 17:
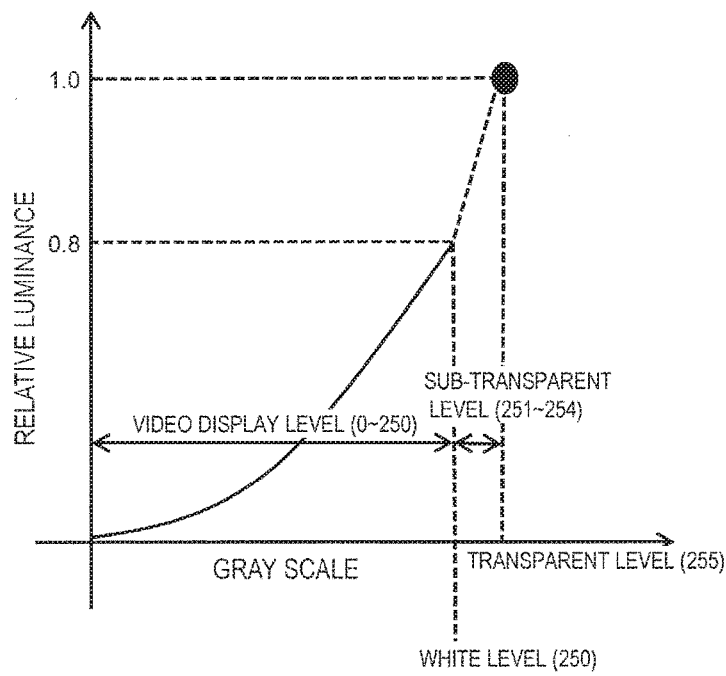
FIG. 17 is a graph showing another example of gray scale level settings in the liquid crystal display device 100 in an embodiment according to the present invention.

FIG. 17 shows an example of gray scale level settings in the case where the number of the video display levels is important. In the example shown in FIG. 17, levels 0 to 250 are set to the video display levels, level 255 is set to the transparent level, and levels 251 to 254 are set to the sub-transparent levels. Namely, level 0 (lowest level) is assigned to the black display state, levels 1 to 249 are assigned to the halftone display state, level 250 is assigned to the white display state, level 255 is assigned to the transparent display state, and levels 251 to 254 are assigned to the sub-transparent display state. In this case, it is difficult to provide the γ characteristic realizing γ=2.2 at the levels higher than the video display levels. However, the voltages at the sub-transparent levels may be set such that the white level and the transparent level are connected with each other as smoothly as possible, so that noise may be made difficult to be visually recognized without much spoiling the gray scale representation of the video display. In the case of the 256-level display system, the number of the sub-transparent levels is preferably 10 or less from the point of view of providing a better gray scale representation of the video display. The upper voltage, the lower voltage and the counter voltage at the plurality of sub-transparent levels may be set so as to provide a higher response speed as described above with reference to FIG. 13, or may be set so as to provide clearer transparent display as described above with reference to FIG. 15.

As described above, at the sub-transparent levels, the luminance (luminance in the steady state) is higher than that of the white level but the response speed is lower than that of the white level. Therefore, the border between the video display levels and the sub-transparent levels maybe specified by measuring the luminance in single-color display (by measuring the single-color luminance) in, for example, the following manner.

Figure 35:
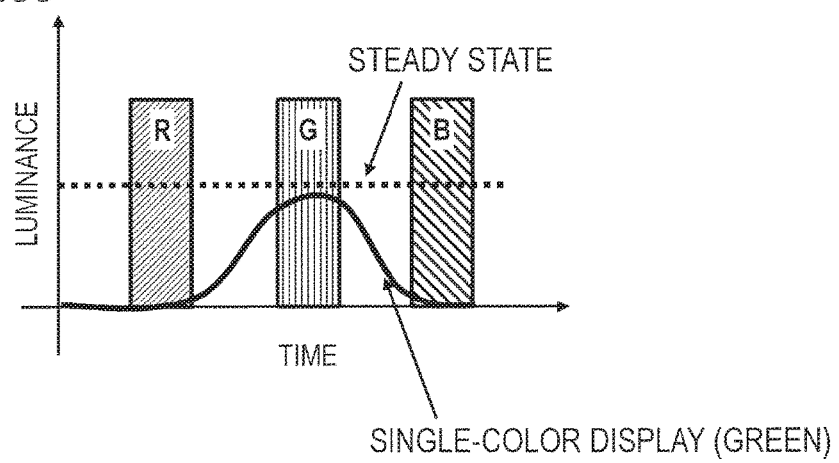
FIG. 35 is a graph showing the luminance in green single-color display and the luminance in the steady state.

FIG. 35 shows the luminance in green single-color display and the luminance in the steady state. As seen from FIG. 35, single-color display is display in which the liquid crystal layer 30 is put into a light-transmissive state only in one of a red sub frame R (period in which red light is directed from the illumination element 2 toward the liquid crystal display panel 1), a green sub frame G (period in which green light is directed from the illumination element 2 toward the liquid crystal display panel 1), and a blue sub frame B (period in which blue light is directed from the illumination element 2 toward the liquid crystal display panel 1).

Figure 36:
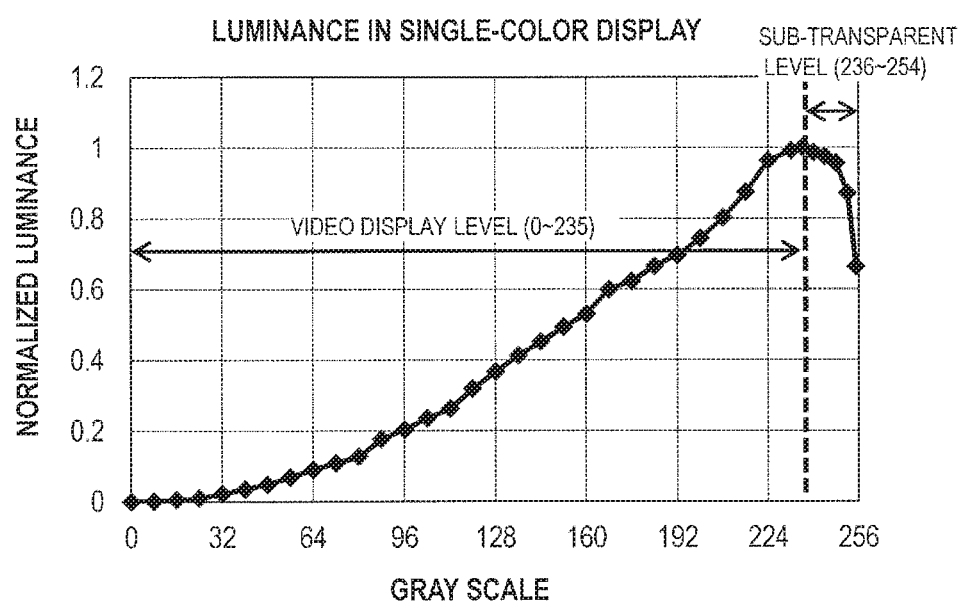
FIG. 36 is a graph showing the luminance in the single-color display in the case where levels 236 to 254 are set to sub-transparent levels.

FIG. 36 shows the luminance in the single-color display in the case where levels 236 to 254 are set to the sub-transparent levels. At the white level, a lateral electric field (fringe field) strong enough to realize a sufficiently high response speed is applied to the liquid crystal layer 30. By contrast, at the sub-transparent levels, a lateral electric field (fringe field) weaker than that at the white level is applied to the liquid crystal layer 30. Therefore, as seen from FIG. 36, the single-color luminance is highest at the white level. For this reason, the border between the video display levels and the sub-transparent levels may be specified by measuring the single-color luminance.

In the above example, the 256-level display system is described. The embodiment of the present invention is not limited to such a system. The present invention is also applicable to a system other than the 256-level display system, as long as the gray scale level group including the gray scale levels from the lowest level to the highest level includes a plurality of sub-transparent levels between the white level and the transparent level.

In the case where the ratio of the potential difference between the upper electrode 11 and the lower electrode 12 at each gray scale level from the lowest level to the highest level, with respect to the potential difference between the lower electrode 12 and the counter electrode 21 in the black display state, is a predetermined value or less (specifically, 60% or less), the occurrence of abnormal alignment change is suppressed as described below. Hereinafter, this will be described more specifically. In the following, a case where no sub-transparent level is provided will be described first, for the simplicity of explanation.

Figure 18:
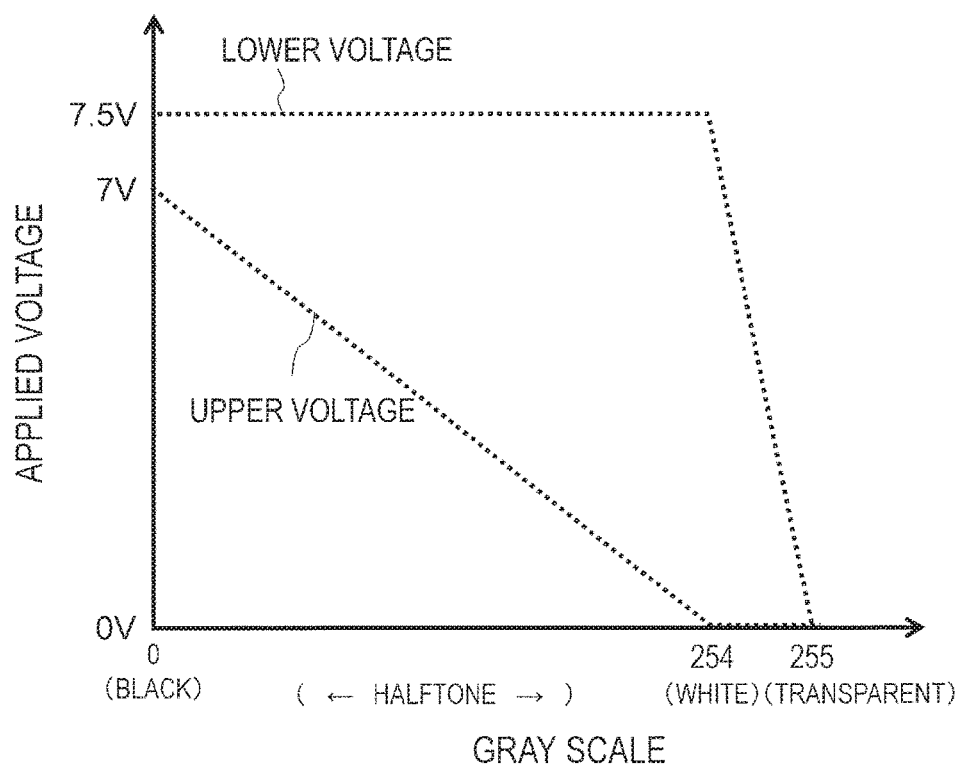
FIG. 18 is a graph showing an example of voltage settings (relationship between the upper voltage/the lower voltage and the gray scale level) with which abnormal alignment change may occur at the time of gray scale level transition.

As a result of active studies, the present inventors have confirmed that when a voltage applied to the upper electrode 11 (upper voltage) and a voltage applied to the lower electrode 12 (lower voltage) are simply set with no specific consideration, abnormal alignment change may occur at the time of gray scale level transition. FIG. 18 shows an example of voltage settings (relationship between the upper voltage/the lower voltage and the gray scale level) with which the abnormal alignment change may occur. Although not shown in FIG. 18, the voltage applied to the counter electrode 21 (counter voltage) is 0 V at all the gray scale levels.

In the example shown in FIG. 18, as the gray scale level is increased from level 0 (corresponding to the black display state) to level 254 (corresponding to the white display state), the upper voltage is decreased while the lower voltage is kept the same. Specifically, the upper voltage is changed (decreased) from 7 V to 0 V while the lower voltage is kept at 7.5 V. At level 255 (corresponding to the transparent display state), the upper voltage and also the lower voltage become 0 V. In this example, there are gray scale levels at which the potential difference between the upper electrode 11 and the lower electrode 12 exceeds 60% of the potential difference between the lower electrode 12 and the counter electrode 21 in the black display state. In the case where the voltage settings shown in FIG. 18 are adopted, abnormal alignment change may occur at the time of gray scale level transition.

Figure 19:
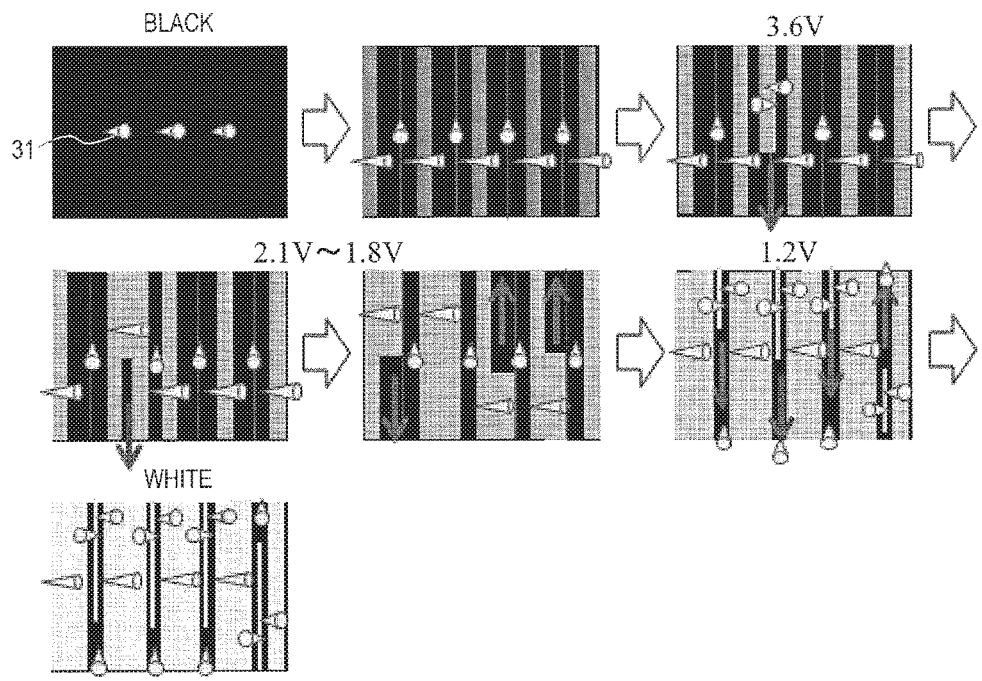
FIG. 19 schematically shows an alignment change from the black display state via the halftone display state to the white display state in the case where the voltage settings shown in FIG. 18 are adopted.

FIG. 19 schematically shows an alignment change from the black display state via the halftone display state to the white display state. As seen from FIG. 19, as the gray scale level is increased, liquid crystal molecules 31 twisted in a direction opposite to the proper twisting direction and liquid crystal molecules 31 tilted in a direction opposite to the proper tilting direction appear in addition to liquid crystal molecules 31 aligned normally.

Figure 20:
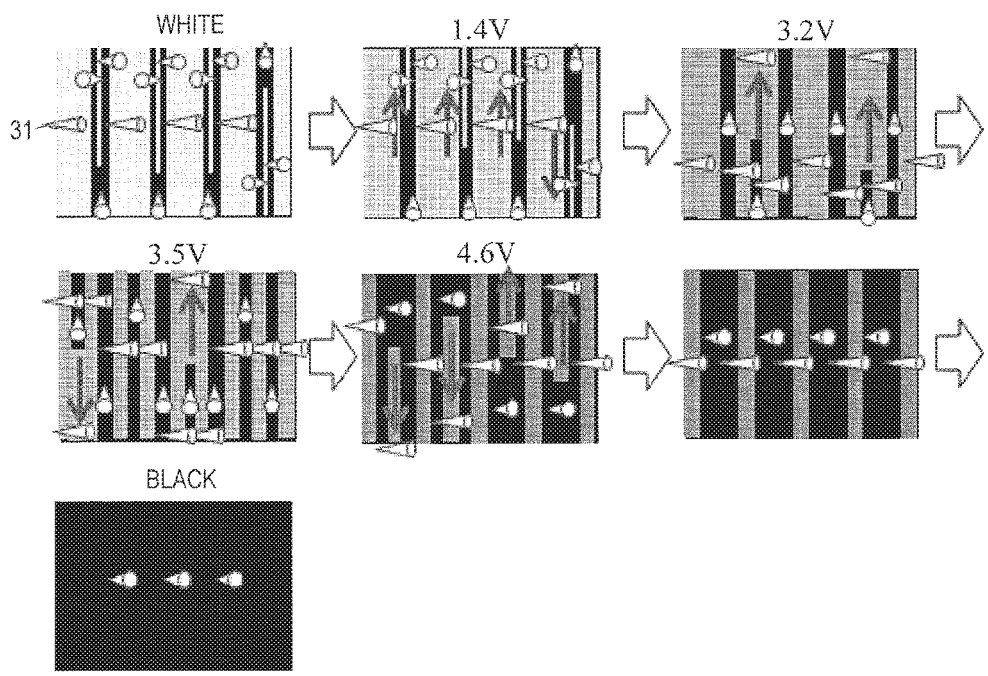
FIG. 20 schematically shows an alignment change from the white display state via the halftone display state to the black display state in the case where the voltage settings shown in FIG. 18 are adopted.

FIG. 20 schematically shows an alignment change from the white display state via the halftone display state to the black display state. As seen from FIG. 20, as the gray scale level is decreased, the number of the liquid crystal molecules 31 twisted in the opposite direction and the liquid crystal molecules 31 tilted in the opposite direction is decreased.

As seen from above, in the case where the voltage settings shown in FIG. 18 are adopted, abnormal alignment change may occur at the time of gray scale level transition. FIG. 19 and FIG. 20 show how white lines and black lines caused by the abnormal alignment change extend. The abnormal alignment change occurs at a visually recognizable speed (several hundred milliseconds to several seconds). The degree of abnormal alignment change varies inside each pixel and/or on a pixel-by-pixel basis. Therefore, the abnormal alignment change is observed as display non-uniformity or roughness, which declines the display quality.

With reference to FIG. 21(a) and FIG. 21(b), an observation of the present inventors on a mechanism by which the abnormal alignment change occurs will be described. The abnormal alignment change is considered to occur because the alignment control force provided by the lateral electric field (fringe field) generated by the potential difference between the upper electrode 11 and the lower electrode 12, and the alignment control force provided by the horizontal alignment films 14 and 24, do not match each other partially. As shown in FIG. 21(a), while the gray scale level is increased from the black display state to the white display state, the potential difference between the upper electrode 11 and the lower electrode 12 exceeds a certain threshold. This is considered to cause the abnormal alignment change (herein, this is referred to "set"). As shown in FIG. 21(b), the abnormal alignment change is considered to be solved (herein, this is referred to "reset") while the gray scale level is decreased from the white display state to the black display state.

Figure 22:
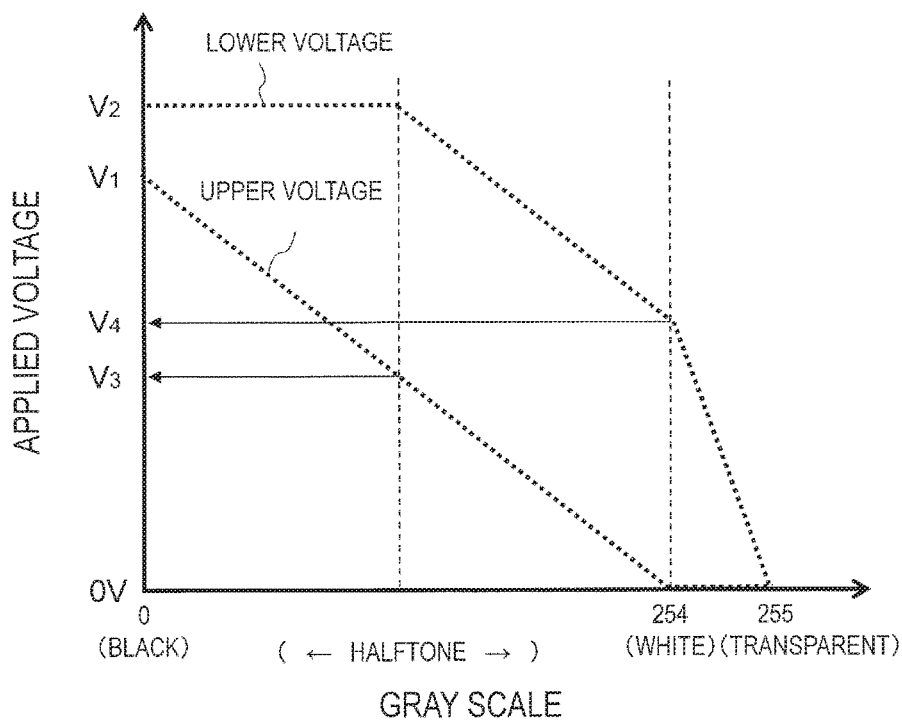
FIG. 22 is a graph showing an example of settings of the upper voltage and the lower voltage with which the abnormal alignment change may be suppressed.

FIG. 22 shows an example of settings of the upper voltage and the lower voltage with which the abnormal alignment change may be suppressed. In this example, as shown in FIG. 22, the potential difference between the upper electrode 11 and the lower electrode 12 is set so as not to exceed a certain threshold. Namely, the ratio of the potential difference between the upper electrode 11 and the lower electrode 12 at each gray scale level from the lowest level to the highest level, with respect to the potential difference between the lower electrode 12 and the counter electrode 21 in the black display state, is set to be a predetermined value or less (specifically, 60% or less).

In the example shown in FIG. 22, as the gray scale level is increased from the lowest level to the highest level, the voltage applied to the upper electrode 11 is decreased. Specifically, as the gray scale level is increased, the upper voltage is decreased from $V_1$ (e.g., 7 V) to 0 V. By contrast, the voltage applied to the lower electrode 12 is kept the same as the gray scale level is increased from the lowest level to a certain halftone level, and is decreased as the gray scale level is increased from the halftone level to the level corresponding to the white display state. Specifically, the lower voltage is kept at $V_2$ (e.g., 7.5 V) as the gray scale level is increased from the lowest level to a certain halftone level (level at which the upper voltage becomes $V_3$), and then is decreased from $V_2$ to $V_4$ at the same ratio as that of the upper voltage as the gray scale level is increased from the halftone level to the level corresponding to the white display state. Namely, in this example, the potential difference between the upper electrode 11 and the lower electrode 12 is set to be $V_4$ or less, and $V_4$ is 60% or less of the potential difference $V_2$ between the lower electrode 12 and the counter electrode 21 in the black display state.

The present inventors made an investigation on whether the abnormal alignment change would be suppressed or not in a plurality of settings different from each other in the maximum potential difference between the upper electrode 11 and the lower electrode 12. The results will be described. Table 1 shows, for each of settings 1 through 5, the upper voltage and the lower voltage in the black display state, the upper voltage when the lower voltage starts to be decreased ($V_3$ in FIG. 22), the upper voltage and the lower voltage in the white display state ($V_4$ in FIG. 22), and whether the abnormal alignment change is suppressed or not. In Table 1, "×" indicates that the abnormal alignment change occurred, and "○" indicates that the abnormal alignment change was suppressed. "Δ" indicates that the abnormal alignment change was basically suppressed, but the abnormal alignment change occurred when the gray scale level was changed to the level corresponding to the white display state in a certain manner. The investigation results shown in Table 1 were obtained under the following conditions: width S of the slit 11a of the upper electrode 11: 3 μm; width L of the branched portion 11b: 4 μm; and dielectric anisotropy 46 of the liquid crystal material used for the liquid crystal layer 30: 17.8.

TABLE 1

| | BLACK DISPLAY STATE | | UPPER VOLTAGE WHEN LOWER VOLTAGE STARTS TO BE DECREASED (V) | WHITE DISPLAY STATE | | WHETHER ABNORMAL ALIGNMENT IS SUPPRESSED |
|---|---|---|---|---|---|---|
| | UPPER VOLTAGE (V) | LOWER VOLTAGE (V) | | UPPER VOLTAGE (V) | LOWER VOLTAGE (V) | |
| SETTING 1 | 7 | 7.5 | — | 0 | 7.5 | X |
| SETTING 2 | | | 2 | | 5.5 | X |
| SETTING 3 | | | 3 | | 4.5 | X |
| SETTING 4 | | | 3.5 | | 4 | Δ |
| SETTING 5 | | | 4 | | 3.5 | ○ |

As seen from Table 1, in settings 1, 2 and 3, in which the maximum potential difference between the upper electrode 11 and the lower electrode 12 (same potential as the lower voltage in the white display state) was 7.5 V, 5.5 V and 4.5 V, the abnormal alignment change occurred. By contrast, in setting 4, in which the maximum potential difference between the upper electrode 11 and the lower electrode 12 was 4 V, the abnormal alignment change was suppressed. In setting 5, in which the maximum potential difference between the upper electrode 11 and the lower electrode 12 was 3.5 V, the abnormal alignment change was further suppressed.

Regarding each of settings 1 through 5, an investigation was made on whether the abnormal alignment change would be suppressed or not while the manner of transition of the gray scale level to the level corresponding to the white display state in various manners was changed. Table 2 shows the investigation results obtained when the transparent display state was suddenly changed to the white display state, when the black display state was suddenly changed to the white display state, when the black display state was gradually changed to the white display state, and when the transparent display state was gradually changed to the white display state. In Table 2, "x" indicates that the abnormal alignment change occurred, and "○" indicates that the abnormal alignment change was suppressed.

As seen from Table 2, in settings 1 through 3, the abnormal alignment change occurred in any of the manners of transition. In setting 4, the abnormal alignment change was suppressed when the transparent display state was suddenly changed to the white display state and when the black display state was suddenly changed to the white display state, but the abnormal alignment change occurred when the black display state was gradually changed to the white display state and when the transparent display state was gradually changed to the white display state. By contrast, in setting 5, the abnormal alignment change was suppressed in any of the manners of transition.

An investigation was made on whether the abnormal alignment change would be suppressed or not while the specification of the liquid crystal display panel 1 was changed. Table 3 shows the investigation results. Table 3 shows, in each of specifications 1 through 4, whether the abnormal alignment change was suppressed or not at various values of the dielectric anisotropy Δε of the liquid crystal material, the length L (μm) of the branched portion 11b of the upper electrode 11 and the width S (μm) of the slit 11a of the upper electrode 11, and when the lower voltage in the white display state was 3 V, 3.5 V, 4 V and 4.5 V. Specification 1 is used for the results shown in Table 1. In Table 3, "x", "○" and "Δ" indicate the same as those in Table 1.

TABLE 2

| MANNER OF TRANSITION TO WHITE DISPLAY STATE | LOWER VOLTAGE IN WHITE DISPLAY STATE (=MAXIMUM POTENTIAL DIFFERENCE BETWEEN UPPER ELECTRODE AND LOWER ELECTRODE) | | | | |
|---|---|---|---|---|---|
| | SETTING 1: 7.5 V | SETTING 2: 5.5 V | SETTING 3: 4.5 V | SETTING 4: 4 V | SETTING 5: 3.5 V |
| SUDDENLY FROM TRANSPARENT DISPLAY STATE | X | X | X | ○ | ○ |
| SUDDENLY FROM BLACK DISPLAY STATE | X | X | X | ○ | ○ |
| GRADUALLY FROM BLACK DISPLAY STATE | X | X | X | X | ○ |
| GRADUALLY FROM TRANSPARENT DISPLAY STATE | X | X | X | X | ○ |

TABLE 3

| | Δε OF LIQUID CRYSTAL MATERIAL | L/S OF UPPER ELECTRODE | LOWER VOLTAGE IN WHITE DISPLAY STATE (=MAXIMUM POTENTIAL DIFFERENCE BETWEEN UPPER ELECTRODE AND LOWER ELECTRODE) | | | |
|---|---|---|---|---|---|---|
| | | | 3 V | 3.5 V | 4 V | 4.5 V |
| SPECIFICATION 1 | 17.8 | 4/3 | — | ○ | Δ | X |
| SPECIFICATION 2 | | 5/3 | — | ○ | ○ | Δ |
| SPECIFICATION 3 | | 3/5 | ○ | Δ | X | — |
| SPECIFICATION 4 | 20 | 5/3 | — | ○ | Δ | — |

As shown in Table 3, when the maximum potential difference between the upper electrode 11 and the lower electrode 12 was 4.5 V, the abnormal alignment change was suppressed in specification 2. When the maximum potential difference was 4 V, the abnormal alignment change was suppressed in specifications 1, 2 and 4. When the maximum potential difference was 3.5 V, the abnormal alignment change was suppressed in any of specifications 1 through 4.

It is seen from these results that in the case where the potential difference between the upper electrode 11 and the lower electrode 12 at each gray scale level from the lowest level to the highest level is 60% or less of the potential difference between the electrode 11 and the counter electrode 12 in the black display state, the abnormal alignment change is suppressed. It is also seen that from the point of view of suppressing the abnormal alignment change, the potential difference between the upper electrode 11 and the lower electrode 12 at each gray scale level from the lowest level to the highest level is preferably 54% or less, and more preferably 47% or less, of the potential difference between the electrode 11 and the counter electrode 12 in the black display state.

When the maximum potential difference between the upper electrode 11 and the lower electrode 12 is too small, the response speed may be undesirably decreased. Therefore, from the point of view of the response speed, it is considered to be preferable that the maximum potential difference between the upper electrode 11 and the lower electrode 12 is as large as possible in the range in which the abnormal alignment change is suppressed. Specifically, at a gray scale level, among all the gray scale levels from the lowest level to the highest level, at which the potential difference between the upper electrode 11 and the lower electrode 12 is maximum, the potential difference between the upper electrode 11 and the lower electrode 12 is preferably 30% or greater, and more preferably 40% or greater, of the potential difference between the lower electrode 12 and the counter electrode 21 in the black display state.

Figure 23:
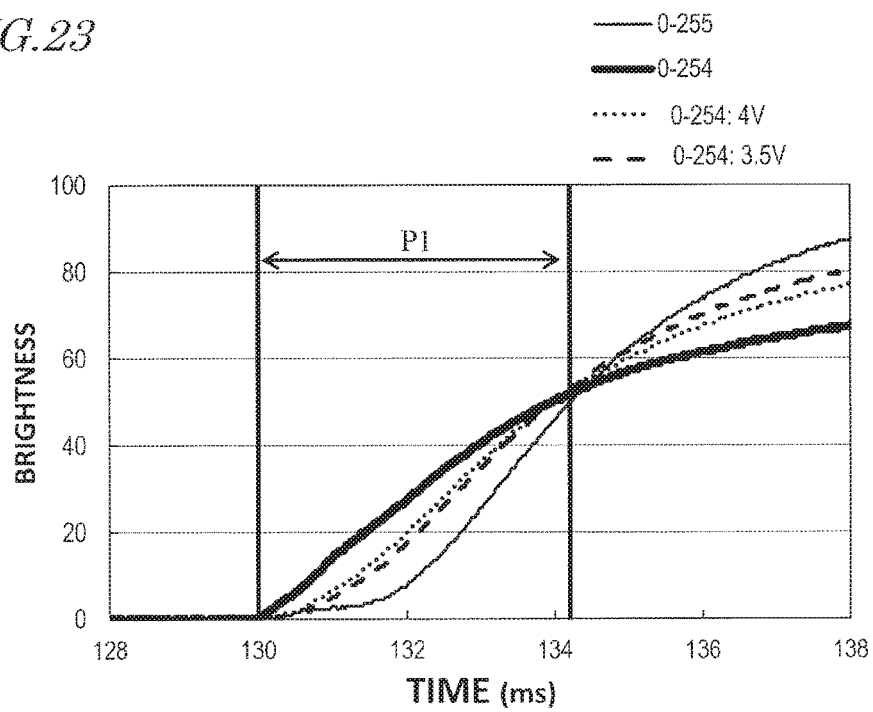
FIG. 23 is a graph showing response waveforms (time vs. brightness relationships) of rise response.

FIG. 23 shows the response waveforms (time vs. brightness relationships) of rise response in settings 4 and 5 shown in Table 1. FIG. 23 shows the response waveforms when the black display state is switched to the white display state at the maximum potential difference of 4 V (setting 4) and 3.5 V (setting 5) (respectively labeled as "0-254: 4 V" and "0-254: 3.5 V"). For a comparison, FIG. 23 also shows the response waveforms when the black display state is switched to the white display state (labeled as "0-254") and when the black display state is switched to the transparent display state (labeled as "0-255") at the maximum potential difference of 7.5 V (setting 1). The brightness values along the vertical axis in FIG. 23 are relative values with respect to the brightness in the transparent display state being 100 (this is also applied to FIG. 25 described below).

As seen from FIG. 23, the rise response when the maximum potential difference is 3.5 V or 4 V (0-254: 3.5 V, 0-254: 4 V) is slightly lower than the rise response when the maximum potential difference is 7.5 V (0-254), but is higher than the response to the switch from the black display state to the transparent display state (0-255). Even in the case where the maximum potential difference between the upper electrode 11 and the lower electrode 12 is made smaller to a certain degree, a sufficiently high response speed is guaranteed.

Figure 24:
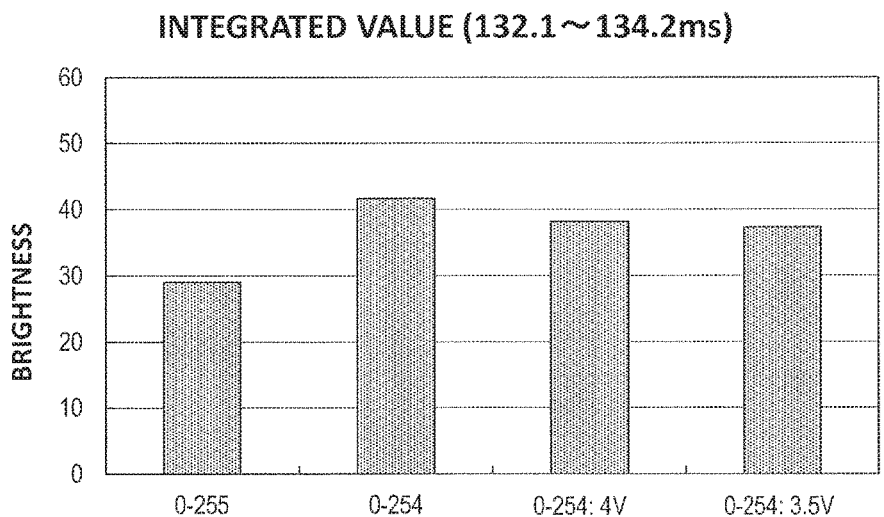
FIG. 24 is a graph showing waveform integrated values in a second half of period P1 shown in FIG. 23 (132.1 to 134.2 ms).

FIG. 24 shows the waveform integrated values in a second half of period P1 shown in FIG. 23 (132.1 to 134.2 ms). Herein, it is assumed to perform field sequential driving with a frame frequency of 240 Hz (1 frame: about 4.2 msec.) and a duty ratio (period in which the backlight is lit on) of 50%.

As seen from FIG. 24, when the maximum potential difference is 3.5 V or 4 V (0-254: 3.5 V, 0-254: 4 V), the brightness is lower by about 10% than the brightness when the maximum potential difference is 7.5 V (0-254).

Figure 25:
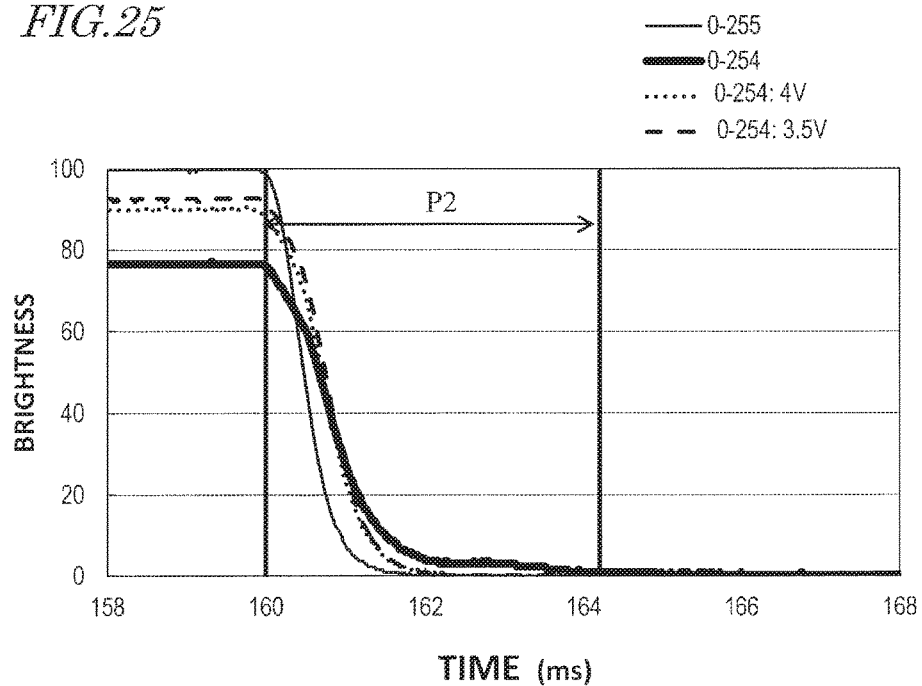
FIG. 25 is a graph showing response waveforms (time vs. brightness relationships) of decay response.

FIG. 25 shows the response waveforms (time vs. brightness relationships) of decay response in settings 4 and 5 shown in Table 1. FIG. 25 shows the response waveforms when the white display state is switched to the black display state at the maximum potential difference of 4 V (setting 4) and 3.5 V (setting 5) (respectively labeled as "0-254: 4 V" and "0-254: 3.5 V"). For a comparison, FIG. 25 also shows the response waveforms when the white display state is switched to the black display state (labeled as "0-254") and when the transparent display state is switched to the black display state (labeled as "0-255") at the maximum potential difference of 7.5 V (setting 1).

As seen from FIG. 25, the decay response when the maximum potential difference is 3.5 V or 4 V (0-254: 3.5 V, 0-254: 4 V) is higher than the decay response when the maximum potential difference is 7.5 V (0-254). As can be seen, the decay response is improved by decreasing the maximum potential difference between the upper electrode 11 and the lower electrode 12. It is seen from the waveforms at 158 to 160 ms that the color of white is made brighter by decreasing the lower voltage in the white display state.

Figure 26:
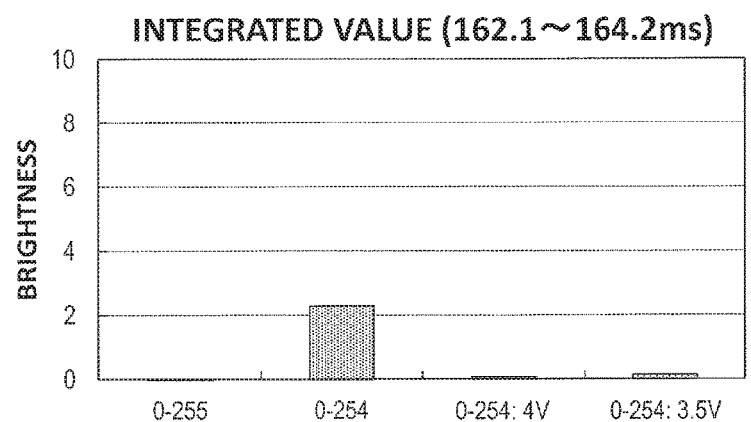
FIG. 26 is a graph showing waveform integrated values in a second half of period P2 shown in FIG. 25 (162.1 to 164.2 ms).

FIG. 26 shows the waveform integrated values in a second half of period P2 shown in FIG. 25 (162.1 to 164.2 ms). Herein, it is assumed to perform field sequential driving with a frame frequency of 240 Hz and a duty ratio of 50%.

As seen from FIG. 26, when the maximum potential difference is 3.5 V or 4 V (0-254: 3.5 V, 0-254: 4 V), the black display is darker than when the maximum potential difference is 7.5 V (0-254). As can be seen, when the field sequential driving is performed, the occurrence of color mixing is suppressed by decreasing the maximum potential difference between the upper electrode 11 and the lower electrode 12.

As described above, even when the maximum potential difference between the upper electrode 11 and the lower electrode 12 is decreased (even when the lower voltage in the white display state is decreased), a sufficiently high rise response speed is realized. In addition, the decay response is improved, and brighter white display is realized.

Figure 27:
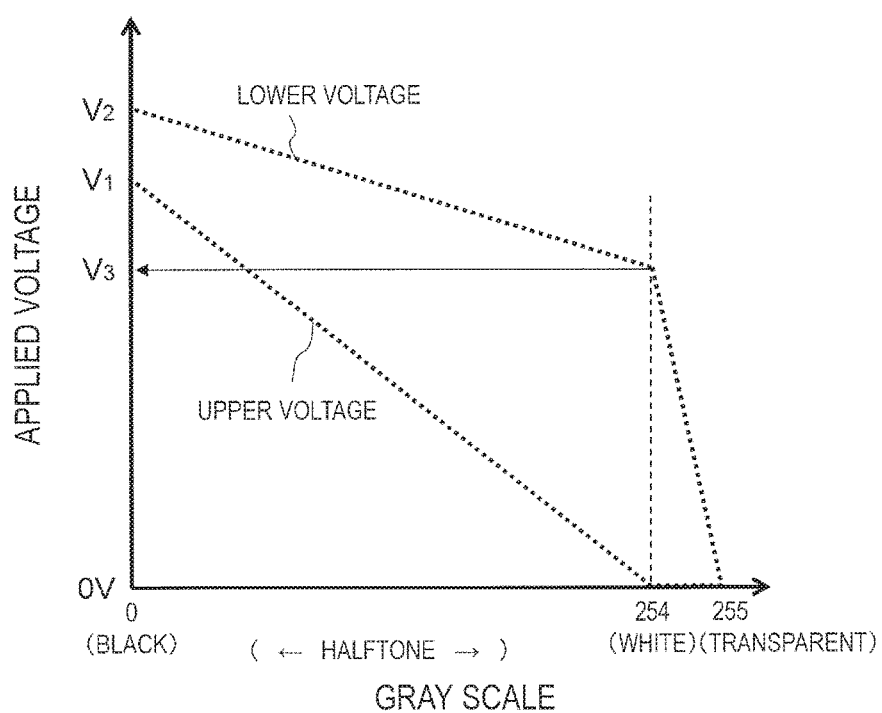
FIG. 27 is a graph showing another example of settings of the upper voltage and the lower voltage with which the abnormal alignment change may be suppressed.

FIG. 27 shows another example of settings of the upper voltage and the lower voltage.

In the example shown in FIG. 27, the voltage applied to the upper electrode 11 is decreased as the gray scale level is increased from the lowest level to the level corresponding to the white display state. Specifically, the upper voltage is decreased from $V_1$ (e.g., 7 V) to 0 V as the gray scale level is increased. The voltage applied to the lower electrode 12 is also decreased as the gray scale level is increased from the lowest level to the level corresponding to the white display state. Specifically, the lower voltage is decreased from $V_2$ (e.g., 7.5 V) to $V_3$ (predetermined voltage exceeding 0 V) at a ratio lower than that of the upper voltage, as the gray scale level is increased. Namely, in this example, the potential difference between the upper electrode 11 and the lower electrode 12 is set to be $V_3$ or less, and $V_3$ is 60% or less of the potential difference $V_2$ between the lower electrode 12 and the counter electrode 21 in the black display state.

From the point of view of realizing high speed response, it is preferable that as strong a lateral electric field (fringe field) as possible is applied to the liquid crystal layer 30 at many gray scale levels. Therefore, from the point of view of providing a high response characteristic, the example shown in FIG. 22 is considered to be preferable to the example shown in FIG. 27.

As described above, the potential difference between the upper electrode 11 and the lower electrode 12 at each gray scale level is 60% or less of the potential difference between the lower electrode 12 and the counter electrode 21 in the black display state. This suppresses the occurrence of the abnormal alignment change at the time of gray scale level transition. In the above example described with reference to FIG. 22 through FIG. 27, the sub-transparent levels are not provided.

Figure 28:
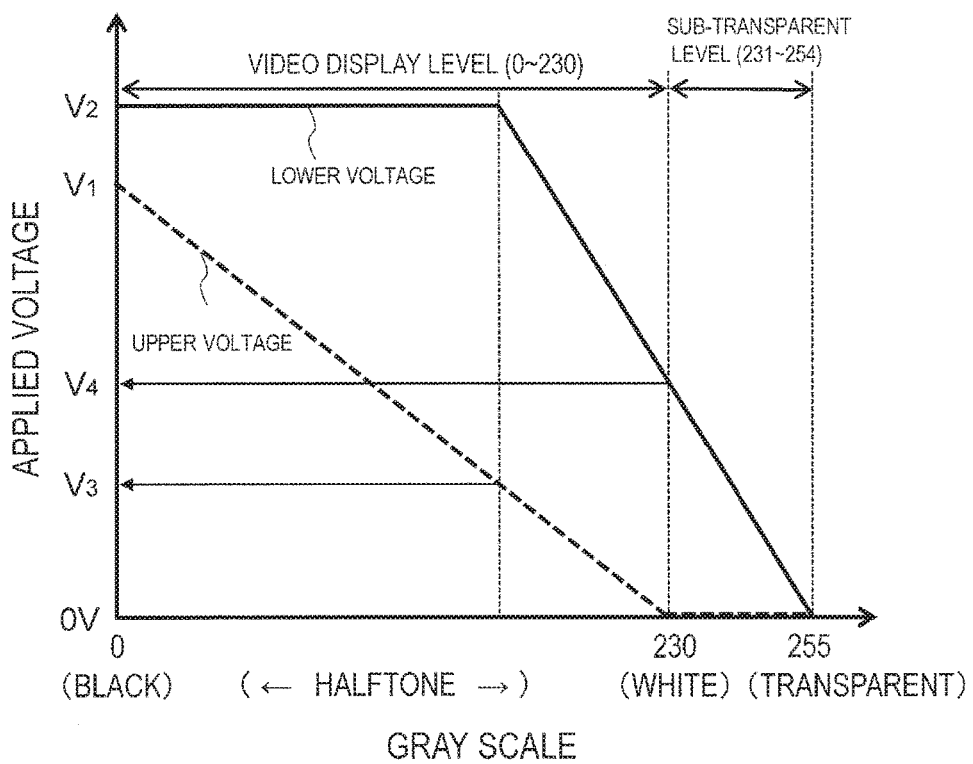
FIG. 28 is a graph showing an example of settings of the upper voltage and the lower voltage with which the abnormal alignment change may be suppressed in the liquid crystal display device 100.

FIG. 28 shows an example of voltage settings in the case where the gray scale level group includes a plurality of sub-transparent levels and the potential difference between the upper electrode 11 and the lower electrode 12 at each gray scale level is 60% or less of the potential difference between the lower electrode 12 and the counter electrode 21 in the black display state.

In the example shown in FIG. 28, the voltage applied to the upper electrode 11 is decreased as the gray scale level is increased from the lowest level to the level corresponding to the white display state. Specifically, the upper voltage is decreased from $V_1$ (e.g. 7 V) to 0 V as the gray scale level is increased. By contrast, the voltage applied to the lower electrode 12 is kept the same as the gray scale level is increased from the lowest level to a halftone level, and is decreased as the gray scale level is increased from the halftone level to the level corresponding to the white display state. Specifically, the lower voltage is kept at $V_2$ (e.g., 7.5 V) as the gray scale level is increased from the lowest level to a halftone level (level at which the upper voltage becomes $V_3$), and is decreased from $V_2$ to $V_4$ at a ratio higher than that of the upper voltage, as the gray scale level is increased from the halftone level to the level corresponding to the white display state. Namely, in this example, the potential difference between the upper electrode 11 and the lower electrode 12 is set to be ($V_2-V_3$) or less. ($V_2-V_3$) is 60% or less of the potential difference $V_2$ between the lower electrode 12 and the counter electrode 21 in the black display state.

FIG. 28 shows a case where the ratio of decrease in the lower voltage from a halftone level to the level corresponding to the white display state is higher than the ratio of decrease in the upper voltage. Alternatively, the ratio of decrease in the lower voltage may be equal to the ratio of decrease in the upper voltage, or may be lower than the ratio of decrease in the upper voltage. Like in the example shown in FIG. 27, there may not be a period in which the lower voltage is kept the same. The maximum potential difference between the upper electrode 11 and the lower electrode 12 is 60% or less of the potential difference between the lower electrode 12 and the counter electrode 21 in the black display state, so that the occurrence of the abnormal alignment change at the time of gray scale level transition is suppressed.

In the above description, in the transparent display state, the liquid crystal molecules 31 in the liquid crystal layer 30 assume twisted alignment. Such a structure realizes clearer transparent display for the following reason. When assuming twisted alignment, the liquid crystal molecules 31 are oriented in the same direction in a plane parallel to the display surface. Therefore, there is no diffraction caused by the refractive index difference in the plane or diffraction by the dark line caused by the liquid crystal mode (dark line caused by a structural body controlling the alignment direction or dark line by discontinuity in the alignment direction caused in the plane).

In this example, in the white display state and the transparent display state, the liquid crystal molecules 31 at, and in the vicinity of, the central portion of the liquid crystal layer 30 in the thickness direction are aligned to be generally perpendicular to the slit direction D (namely, the average alignment direction of the bulk liquid crystal portion is generally perpendicular to the slit direction D). Alternatively, the liquid crystal molecules 31 at, and in the vicinity of, the central portion of the liquid crystal layer 30 in the thickness direction may be aligned to be generally parallel to the slit direction D (namely, the average alignment direction of the bulk liquid crystal portion is generally parallel to the slit direction D). It should be noted that the former structure (perpendicular type structure) is preferable to the latter structure (parallel type structure) from the point of view of display brightness.

Figure 29:
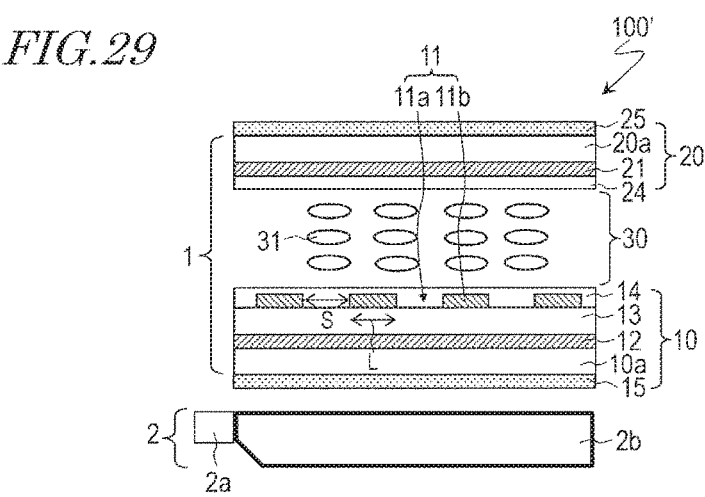
FIG. 29 is a cross-sectional view schematically showing another liquid crystal display device 100' in an embodiment according to the present invention.

Still alternatively, as in a liquid crystal display device 100' shown in FIG. 29 and FIG. 30, the liquid crystal molecules 31 in the liquid crystal layer 30 may assume homogeneous alignment in the transparent display state.

In the liquid crystal display device 100', the pretilt directions respectively controlled by the first horizontal alignment film 14 and the second horizontal alignment state 24 are set such that the liquid crystal molecules 31 assume homogeneous alignment in the state where no voltage is applied to the liquid crystal layer 30 (in the state where no electric field is generated). Specifically, the pretilt directions respectively controlled by the first horizontal alignment film 14 and the second horizontal alignment state 24 are generally perpendicular to the direction in which the slits 11a of the upper electrode 11 extend (generally perpendicular to the slit direction D). Namely, the pretilt direction controlled by the first horizontal alignment film 14 and the pretilt direction controlled by the second horizontal alignment film 24 are parallel or antiparallel to each other.

The transmission axes 15a and 25a of the first polarization plate 15 and the second polarization plate 25 have an angle of about 45 degrees with respect to the pretilt directions respectively controlled by the first horizontal alignment film 14 and the second horizontal alignment film 24. Therefore, the transmission axes 15a and 25a of the first polarization plate 15 and the second polarization plate 25 have an angle of about 45 degrees with respect to the slit direction D.

FIG. 31(a) and FIG. 31(b) show an alignment state of the liquid crystal molecules 31 in the black display state. In the black display state, a predetermined voltage is applied between the counter electrode 21 and the upper electrode 11/the lower electrode 12 (for example, potentials of 7 V, 7.5 V and 0 V are respectively given to the upper electrode 11, the lower electrode 12 and the counter electrode 21), and a vertical electric field is generated in the liquid crystal layer 30. FIG. 31(a) schematically shows line of electric force in this state with dashed lines.

In the black display state, as shown in FIG. 31(a) and FIG. 31(b), the liquid crystal molecules 31 in the liquid crystal layer 30 are aligned to be generally vertical to the substrate surface (surfaces of the rear substrate 10 and the front substrate 20) (namely, aligned to be generally parallel to the normal to the liquid crystal layer 30).

FIG. 32(a) and FIG. 32(b) show an alignment state of the liquid crystal molecules 31 in the white display state. In the white display state, a predetermined voltage is applied between the upper electrode 11 and the lower electrode 12 (for example, potentials of 0 V, 7.5 V and 0 V are respectively given to the upper electrode 11, the lower electrode 12 and the counter electrode 21), and a lateral electric field (fringe field) is generated in the liquid crystal layer 30. FIG. 32(a) schematically shows line of electric force in this state with dashed lines.

In the white display state, as shown in FIG. 32(a) and FIG. 32(b), the liquid crystal molecules 31 in the liquid crystal layer 30 are aligned to be generally parallel to the substrate surface (namely, aligned to be generally vertical to the normal to the liquid crystal layer 30). More specifically, the liquid crystal molecules 31 are aligned to be generally perpendicular to the direction D in which the slits 11a of the upper electrode 11 extend. Namely, the liquid crystal molecules 31 are aligned to have an angle of about 45 degrees with respect to the transmission axes 15a and 25a of the first polarization plate 15 and the second polarization plate 25.

Figure 33:
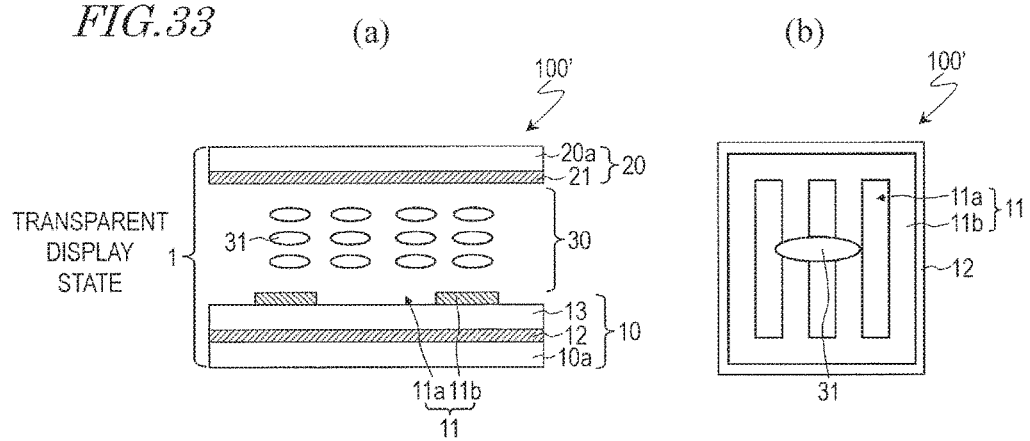
FIG. 33(a) and FIG. 33(b) are respectively a cross-sectional view and a plan view showing an alignment state of the liquid crystal molecules 31 in the transparent display state of the liquid crystal display device 100'.

FIG. 33(a) and FIG. 33(b) show an alignment state of the liquid crystal molecules 31 in the transparent display state. In the transparent display state, no voltage is applied to the liquid crystal layer 30 (for example, a potential of 0 V is given to all of the upper electrode 11, the lower electrode 12 and the counter electrode 21), and neither a vertical electric field nor a lateral electric field is generated in the liquid crystal layer 30.

In the transparent display state, as shown in FIG. 33(a) and FIG. 33(b), the liquid crystal molecules 31 in the liquid crystal layer 30 assume homogeneous alignment. Namely, the liquid crystal molecules 31 are aligned to be generally parallel to the substrate surface (namely, aligned to be generally vertical to the normal to the liquid crystal layer 30). More specifically, the liquid crystal molecules 31 are aligned to be generally perpendicular to the direction D in which the slits 11a of the upper electrode 11 extend. Namely, the liquid crystal molecules 31 are aligned to have an angle of about 45 degrees with respect to the transmission axes 15a and 25a of the first polarization plate 15 and the second polarization plate 25. In this transparent display state, pixels in the liquid crystal display device 100' have a highest light transmittance (namely, higher light transmittance than in the black display state or the white display state).

Also in the liquid crystal display device 100', a vertical electric field is generated in the liquid crystal layer 30 in the black display state and a lateral electric field is generated in the liquid crystal layer 30 in the white display state. Therefore, a torque by voltage application acts on the liquid crystal molecules 31 in both of the fall (transition from the white display state to the black display state) and the rise (transition from the black display state to the white display state), and thus a high speed response characteristic is provided. Each of the pixels may exhibit the black display state, the white display state, and also the transparent display state in which no voltage is applied to the liquid crystal layer 30. Therefore, the problem that the background is blurred (visually recognized double) is prevented. In addition, since the gray scale level group including the gray scale levels from the lowest level to the highest level (set of all the gray scale levels) includes the sub-transparent levels in addition to the white level and the transparent level, the decline in the display quality caused by the luminance difference between the white level and the transparent level is suppressed.

FIG. 1 and FIG. 29 show a structure in which the backlight unit of the edge light system as the illumination element 2 is located on the rear side of the liquid crystal display panel 1 so as to overlap the liquid crystal display panel 1. The illumination element 2 is not limited to being provided in this manner.

Figure 34:
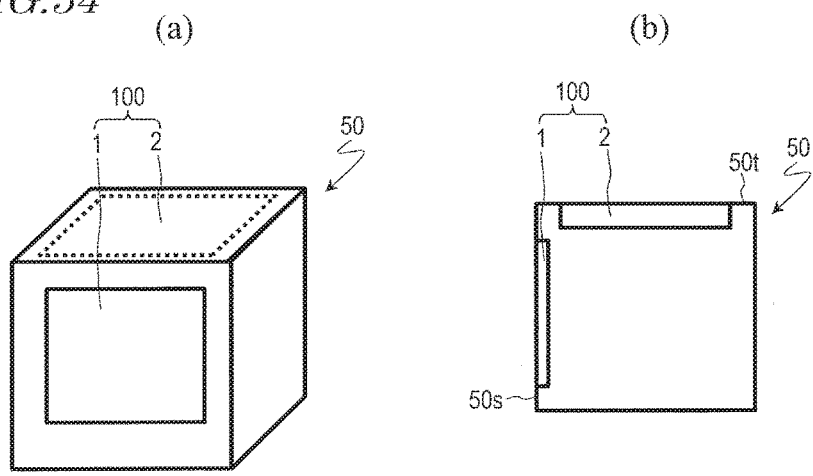
FIG. 34(a) and FIG. 34(b) are respectively an isometric view and a cross-sectional view schematically showing another structure of the liquid crystal display device 100.

For example, the structure shown in FIG. 34 may be adopted. In the structure shown in FIG. 34, the liquid crystal display panel 1 and the illumination element 2 of the liquid crystal display device 100 (or the liquid crystal display device 100') are attached to a box-shaped transparent case 50. The case 50 having the liquid crystal display panel 1 and the illumination element 2 attached thereto is used as, for example, a showcase.

The liquid crystal display panel 1 is attached to a side surface 50s among a plurality of side surfaces of the case 50. The illumination element 2 is attached to a top surface 50t of the case 50. As described above, the illumination element 2 may direct light of a plurality of colors including red light, green light and blue light in a switched manner toward the liquid crystal display panel 1. From the point of view of increasing the light utilization factor (from the point of view of causing light from the illumination element 2 in as much amount as possible to be incident on the liquid crystal display panel 1), it is preferable that an inner surface of the case 50 is light-diffusive.

In the above, color display provided in the field sequential system is described. The liquid crystal display device in an embodiment according to the present invention is not limited to a liquid crystal display device providing color display in the field sequential system. Even a liquid crystal display device including a liquid crystal display panel that includes a color filter prevents display from being blurred (from being visually recognized double) as long as the pixels exhibit the black display state, the white display state and the transparent display state in a switched manner.

INDUSTRIAL APPLICABILITY

An embodiment according to the present invention provides a liquid crystal display device that has a high response characteristic and also provides a high display quality and is preferably usable as a see-through display device. The liquid crystal display device (see-through display device) in an embodiment according to the present invention is usable as a display device for, for example, information display or digital signage.

REFERENCE SIGNS LIST

1 Liquid crystal display panel
2 Illumination element
2a Light source unit
2b Light guide plate
10 First substrate (rear substrate)
10a Transparent substrate
11 First electrode (upper electrode)
11a Slit
11b Branched portion
12 Second electrode (lower electrode)
13 Insulating layer
14 First horizontal alignment film
15 First polarization plate
15a Transmission axis of the first polarization plate
16A First TFT
16B Second TFT
17 Gate bus line
18 Source bus line
20 Second substrate (front substrate)
20a Transparent substrate
21 Third electrode (counter electrode)
24 Second horizontal alignment film
25 Second polarization plate 25a Transmission axis of the second polarization plate
30 Liquid crystal layer
31 Liquid crystal molecule
50 Case
100, 100' Liquid crystal display device

The invention claimed is:

1. A liquid crystal display device, comprising:
a liquid crystal display panel including a first substrate and a second substrate facing each other, and a liquid crystal layer provided between the first substrate and the second substrate; the liquid crystal display device including a plurality of pixels arrayed in a matrix; wherein:
the first substrate includes a first electrode provided in each of the plurality of pixels and a second electrode generating a lateral electric field in the liquid crystal layer together with the first electrode;
the second substrate includes a third electrode provided to face the first electrode and the second electrode, the third electrode generating a vertical electric field in the liquid crystal layer together with the first electrode and the second electrode;
the plurality of pixels each exhibit, in a switched manner,
a black display state where black display is provided in a state where the vertical electric field is generated in the liquid crystal layer,
a white display state where white display is provided in a state where the lateral electric field is generated in the liquid crystal layer, and
a transparent display state where a rear side of the liquid crystal display panel is seen through in a state where no voltage is applied to the liquid crystal layer; and
a gray scale level group including gray scale levels from a lowest level to a highest level includes:
a white level corresponding to the white display state,
a transparent level corresponding to the transparent display state and having a luminance higher than that of the white level, and
a plurality of sub-transparent levels each having a luminance higher than that of the white level and lower than that of the transparent level.

2. The liquid crystal display device according to claim 1, wherein the second electrode is provided below the first electrode with an insulating layer being provided between the first electrode and the second electrode.

3. The liquid crystal display device according to claim 2, wherein:
a potential difference between the first electrode and the second electrode at each of the plurality of sub-transparent levels is smaller than a potential difference between the first electrode and the second electrode at the white level; and
a potential difference between the second electrode and the third electrode at each of the plurality of sub-transparent levels is smaller than a potential difference between the second electrode and the third electrode at the white level.

4. The liquid crystal display device according to claim 3, wherein at the plurality of sub-transparent levels, as the gray scale level is increased, a voltage applied to the second electrode is decreased while a voltage applied to the first electrode is kept the same.

5. The liquid crystal display device according to claim 3, wherein at the plurality of sub-transparent levels, as the gray scale level is increased, voltages applied to both of the first electrode and the second electrode are decreased.

6. The liquid crystal display device according to claim 1, wherein:
the gray scale level group includes 256 gray scale levels; and
the number of the plurality of sub-transparent levels is 20 or greater.

7. The liquid crystal display device according to claim 2, wherein a potential difference between the first electrode and the second electrode at each of the gray scale levels in the gray scale level group is 60% or less of a potential difference between the second electrode and the third electrode in the black display state.

8. The liquid crystal display device according to claim 7, wherein at a gray scale level, in the gray scale level group, at which the potential difference between the first electrode and the second electrode is maximum, the potential difference between the first electrode and the second electrode is 30% or greater of the potential difference between the second electrode and the third electrode in the black display state.

9. The liquid crystal display device according to claim 7, wherein:
a voltage applied to the first electrode is decreased as the gray scale level is increased from the lowest level to the white level; and
a voltage applied to the second electrode is kept the same as the gray scale level is increased from the lowest level to a halftone level, and is decreased as the gray scale level is increased from the halftone level to the white level.

10. The liquid crystal display device according to claim 1, wherein liquid crystal molecules in the liquid crystal layer assume twisted alignment in the transparent display state.

11. The liquid crystal display device according to claim 10, wherein:
the first electrode includes a plurality of slits extending in a predetermined direction; and
in the white display state and the transparent display state, liquid crystal molecules at, and in the vicinity of, a central portion of the liquid crystal layer in a thickness direction are aligned to be generally perpendicular to the predetermined direction.

12. The liquid crystal display device according to claim 1, wherein the liquid crystal layer contains liquid crystal molecules having positive dielectric anisotropy.

13. The liquid crystal display device according to claim 1, further comprising an illumination element directing light of a plurality of colors including red light, green light and blue light in a switched manner toward the liquid crystal display panel.

14. The liquid crystal display device according to claim 1, wherein the liquid crystal display device provides color display in a field sequential system.

15. The liquid crystal display device according to claim 1, wherein the liquid crystal display panel does not include a color filter.

* * * * *